US012389139B2

United States Patent
Ichino et al.

(10) Patent No.: US 12,389,139 B2
(45) Date of Patent: Aug. 12, 2025

(54) PHOTOELECTRIC CONVERSION DEVICE AND METHOD OF DRIVING PHOTOELECTRIC CONVERSION DEVICE

(71) Applicant: CANON KABUSHIKI KAISHA, Tokyo (JP)

(72) Inventors: Shinya Ichino, Tokyo (JP); Takanori Yamashita, Tokyo (JP); Tomoya Kumagai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 191 days.

(21) Appl. No.: 18/174,242

(22) Filed: Feb. 24, 2023

(65) Prior Publication Data
US 2023/0292024 A1    Sep. 14, 2023

(30) Foreign Application Priority Data
Mar. 8, 2022 (JP) ................. 2022-035094

(51) Int. Cl.
*H04N 25/78* (2023.01)
*H04N 25/673* (2023.01)
*H04N 25/703* (2023.01)
*H04N 25/71* (2023.01)

(52) U.S. Cl.
CPC .......... *H04N 25/78* (2023.01); *H04N 25/703* (2023.01); *H04N 25/745* (2023.01)

(58) Field of Classification Search
CPC .... H04N 25/78; H04N 25/703; H04N 25/745; H04N 25/671; H04N 25/673
See application file for complete search history.

(56) References Cited

U.S. PATENT DOCUMENTS

| | | | |
|---|---|---|---|
| 7,903,056 B2 | 3/2011 | Kawasaki | |
| 9,502,451 B2 | 11/2016 | Yamashita | |
| 9,653,498 B2 | 5/2017 | Yamashita | |
| 9,749,570 B2 | 8/2017 | Yamashita | |
| 9,979,916 B2 | 5/2018 | Hiyama | |
| 10,051,223 B2 | 8/2018 | Yamashita | |
| 10,057,529 B2 | 8/2018 | Saito | |
| 10,518,839 B2 * | 12/2019 | Shimamura | H04N 25/677 |

(Continued)

FOREIGN PATENT DOCUMENTS

| | | |
|---|---|---|
| JP | 2010-263526 A | 11/2010 |
| JP | 2012-253624 A | 12/2012 |

(Continued)

*Primary Examiner* — Marly S Camargo
(74) *Attorney, Agent, or Firm* — VENABLE LLP

(57) ABSTRACT

A photoelectric conversion device includes a pixel region in which unit pixels each including a photoelectric conversion unit are arranged to form rows and columns, output lines arranged at least two in each column and each connected to the unit pixel of the corresponding column, column circuits provided corresponding to each of the output lines, and a control circuit configured to control connections between the output lines and the column circuits. The control circuit is configured to connect a first output line to a corresponding first column circuit and disconnect a second output line arranged in the same column as the first output line from a corresponding second column circuit when no pixel signal is output to the second output line at a timing when a pixel signal is output to the first output line.

17 Claims, 10 Drawing Sheets

(56) References Cited

U.S. PATENT DOCUMENTS

| | | |
|---|---|---|
| 10,560,650 B2 * | 2/2020 | Ueno ................ H04N 23/67 |
| 10,742,905 B2 | 8/2020 | Iwata |
| 10,778,920 B2 | 9/2020 | Yamashita |
| 11,070,753 B2 | 7/2021 | Yamashita |
| 11,082,642 B2 | 8/2021 | Fukuhara |
| 11,284,032 B2 | 3/2022 | Shinohara |
| 11,303,830 B2 | 4/2022 | Kumagai |
| 11,394,908 B2 | 7/2022 | Akiyama |
| 11,418,745 B2 | 8/2022 | Yamashita |
| 11,509,852 B2 | 11/2022 | Suzuki |
| 11,523,075 B2 | 12/2022 | Suzuki |
| 11,637,981 B2 | 4/2023 | Yamashita |
| 2010/0283881 A1 | 11/2010 | Araki et al. |
| 2012/0307120 A1 | 12/2012 | Ito et al. |
| 2017/0111602 A1 | 4/2017 | Shimamura et al. |
| 2017/0195603 A1 | 7/2017 | Kawazu et al. |
| 2021/0391365 A1 * | 12/2021 | Kobayashi ............ H04N 25/77 |
| 2024/0284076 A1 * | 8/2024 | Kobayashi ............ H04N 25/77 |

FOREIGN PATENT DOCUMENTS

| | | | |
|---|---|---|---|
| WO | 2015/133323 | A1 | 9/2015 |
| WO | 2015/151793 | A1 | 10/2015 |

* cited by examiner

PHOTOELECTRIC CONVERSION DEVICE AND METHOD OF DRIVING PHOTOELECTRIC CONVERSION DEVICE

BACKGROUND OF THE INVENTION

Field of the Invention

The present invention relates to a photoelectric conversion device and a method of driving a photoelectric conversion device.

Description of the Related Art

There is known a photoelectric conversion device in which a plurality of output lines are arranged in each column of a pixel region, and pixel signals of a plurality of pixel rows are simultaneously read out from the plurality of output lines to thereby read out pixel signals at high speed. In such a photoelectric conversion device, amounts of signals to be read out may change due to potential variation between the output lines, and image quality may deteriorate. International Publication No. WO2015/151793 (hereinafter called "PTL1") discloses an imaging device configured to suppress potential variation between output lines by fixing an output line to a predetermined potential before reading out a pixel reset signal, and to prevent the amounts of signal to be read out from the output lines from being different.

SUMMARY OF THE INVENTION

According to an embodiment of the present disclosure, there is provided a photoelectric conversion device including a pixel region in which a plurality of unit pixels each including a photoelectric conversion unit are arranged to form a plurality of rows and a plurality of columns, a plurality of output lines arranged at least two in each of the plurality of columns and each connected to a unit pixel of a corresponding column, a plurality of column circuits provided corresponding to each of the plurality of output lines, and a control circuit configured to control connections between the plurality of output lines and the plurality of column circuits, wherein the control circuit is configured to connect a first output line out of the plurality of output lines to a corresponding first column circuit and disconnect a second output line out of the plurality of output line arranged in the same column as the first output line from a corresponding second column circuit when no pixel signal is output to the second output line at a timing when a pixel signal is output to the first output line.

According to another embodiment of the present disclosure, there is provided a method of driving a photoelectric conversion device including a pixel region in which a plurality of unit pixels each including a photoelectric conversion unit are arranged to form a plurality of rows and a plurality of columns, a plurality of output lines arranged at least two in each of the plurality of columns and each connected to a unit pixel of a corresponding column, and a plurality of column circuits provided corresponding to each the plurality of output lines, the method including connecting a first output line out of the plurality of output lines to a corresponding first column circuit and disconnecting a second output line out of the plurality of output lines arranged in the same column as the first output line from a corresponding second column circuit, when a driving in which a pixel signal is output to the first output line and a pixel signal is not output to the second output line at a timing when the pixel signal is output to the first output line is performed.

Further features of the present invention will become apparent from the following description of exemplary embodiments with reference to the attached drawings.

DESCRIPTION OF THE EMBODIMENTS

In the imaging device described in PTL1, the potential variation between the output lines may not be sufficiently suppressed depending on a driving mode.

The present disclosure relates to a photoelectric conversion device and a method of driving the photoelectric conversion device capable of effectively suppressing the potential variation between the output lines according to a driving mode.

Preferred embodiments of the present invention will now be described in detail in accordance with the accompanying drawings.

First Embodiment

Figure 1:
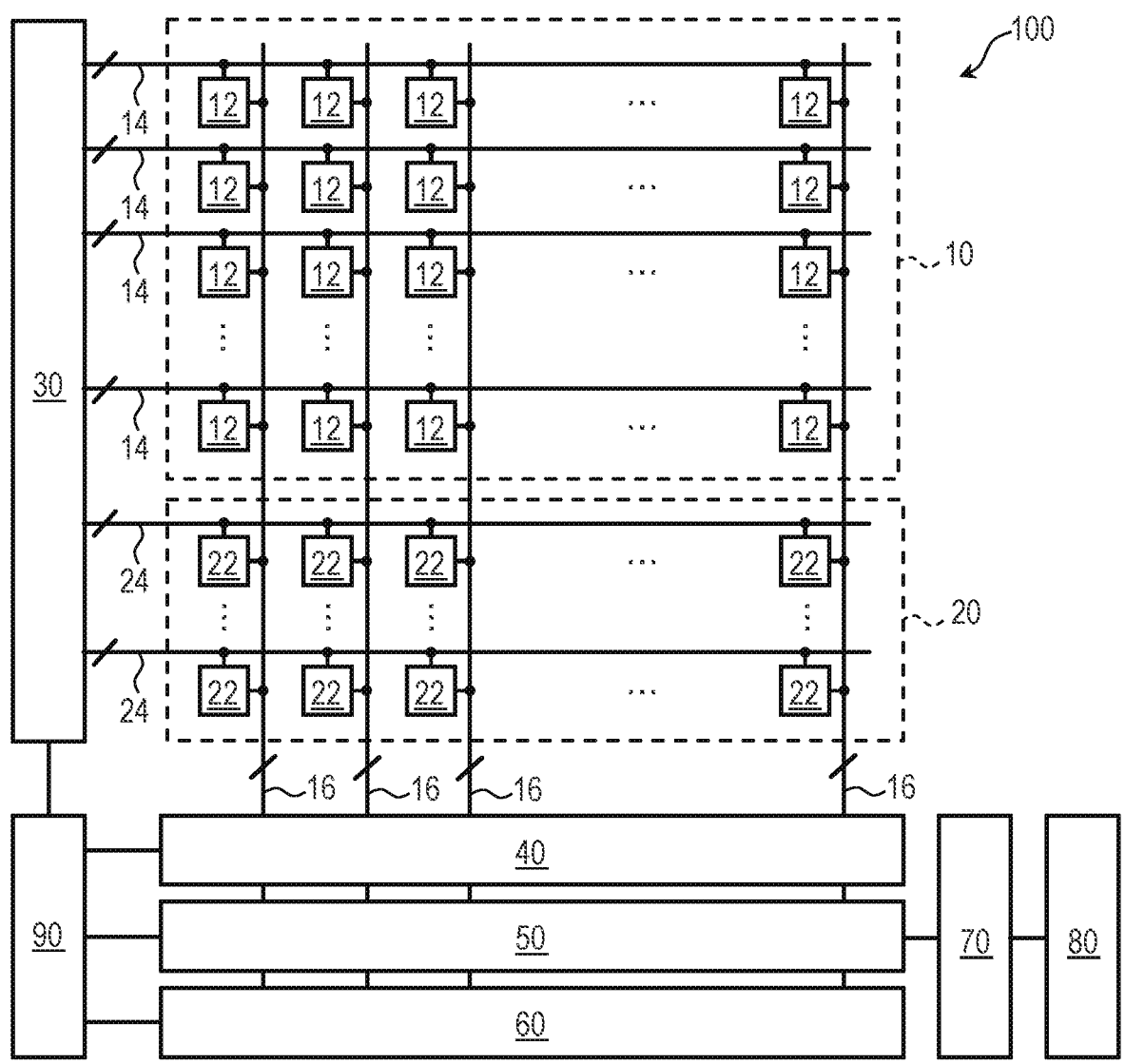
FIG. 1 is a block diagram illustrating a schematic configuration of a photoelectric conversion device according to a first embodiment of the present disclosure.
Figure 2:
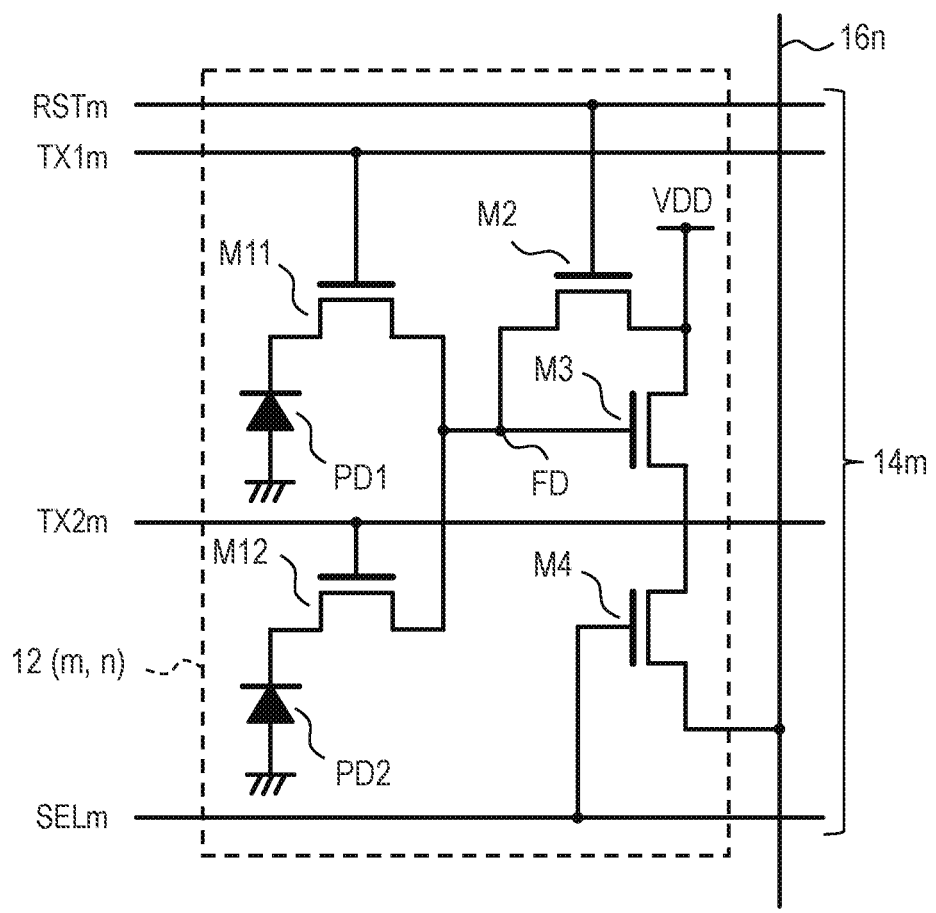
FIG. 2 is a circuit diagram illustrating a configuration example of a unit pixel in the photoelectric conversion device according to the first embodiment of the present disclosure.
Figure 3:
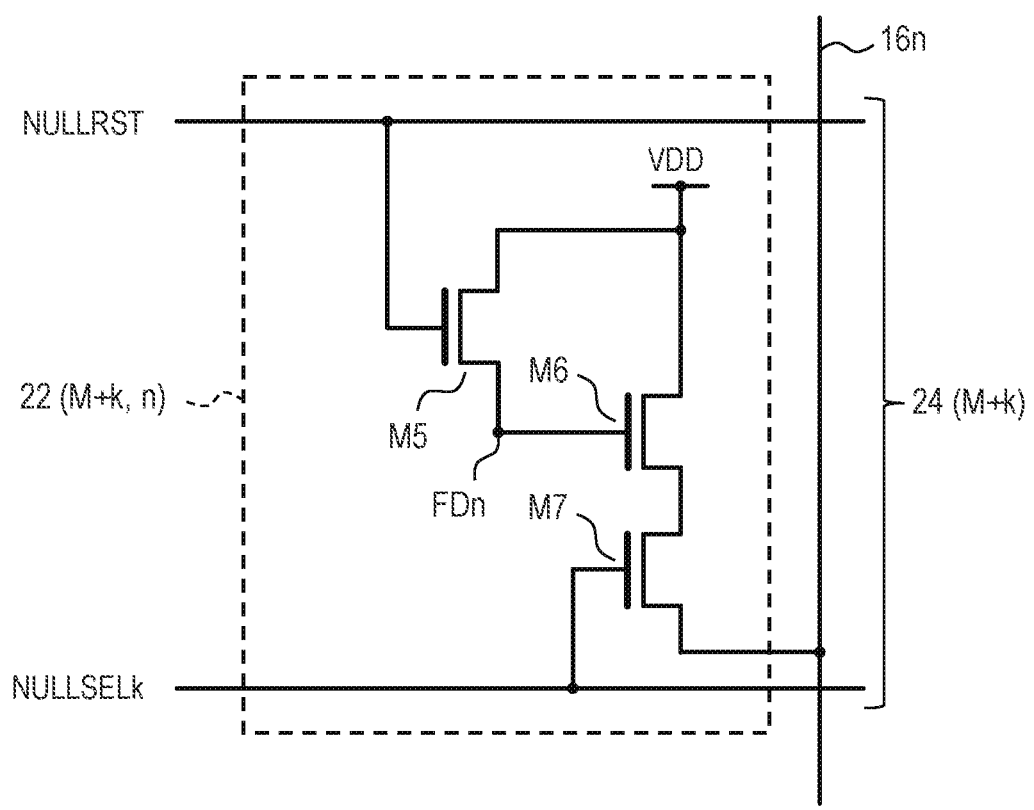
FIG. 3 is a circuit diagram illustrating a configuration example of a null pixel in the photoelectric conversion device according to the first embodiment of the present disclosure.
Figure 4:
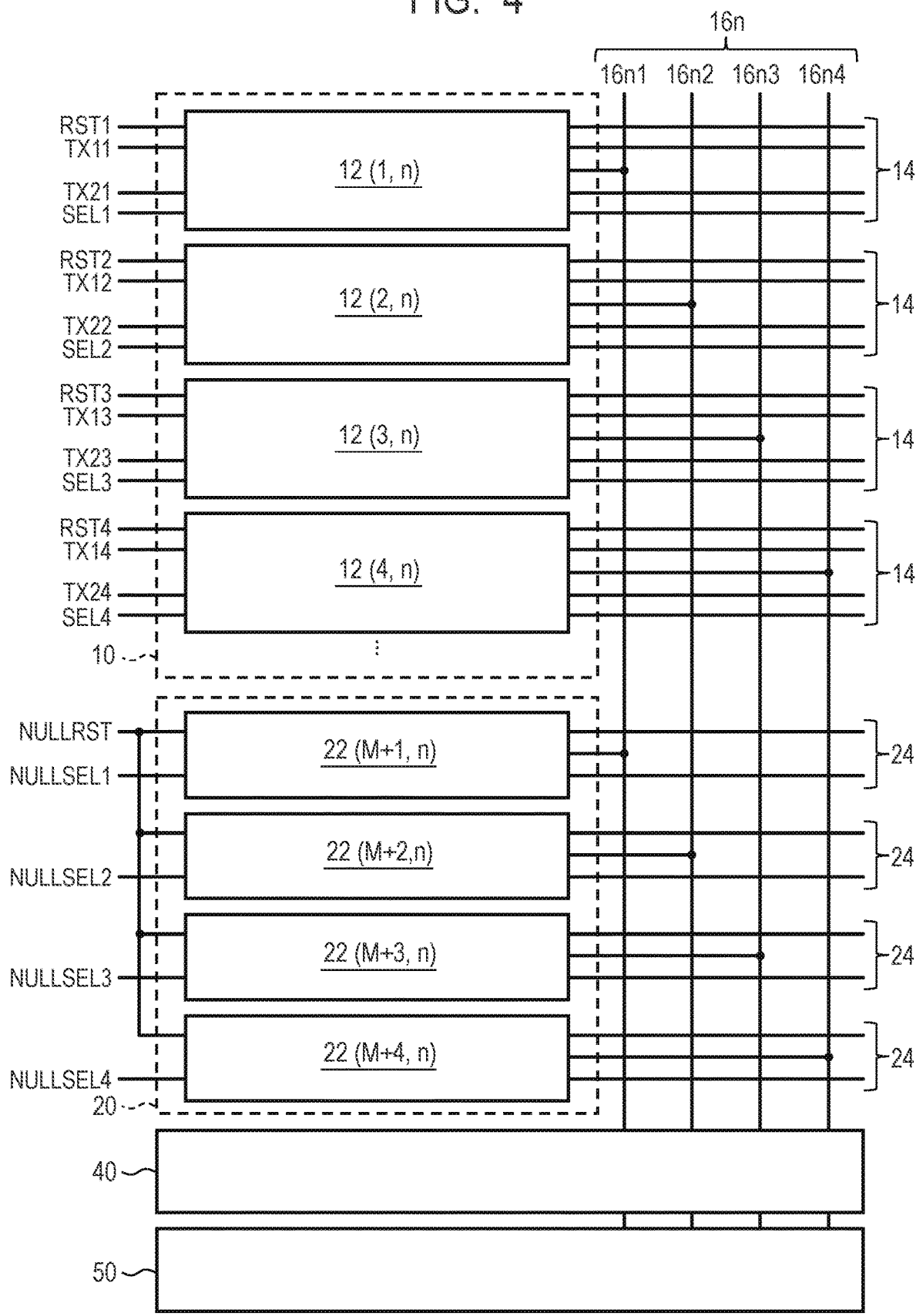
FIG. 4 is a schematic diagram illustrating a connection example of the unit pixels and the null pixels in the photoelectric conversion device according to the first embodiment of the present disclosure.
Figure 5:
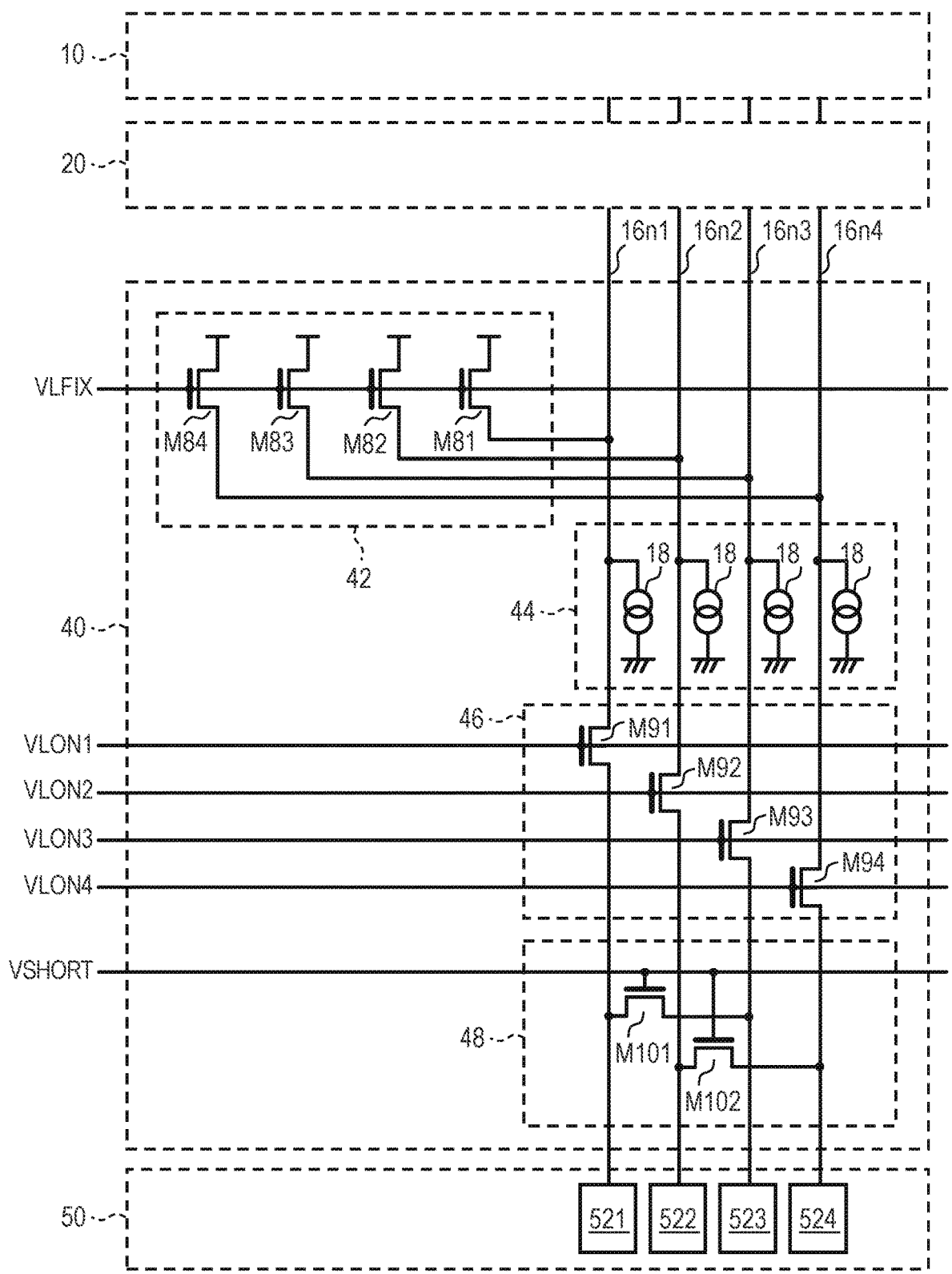
FIG. 5 is a circuit diagram illustrating a configuration example of an output line driving circuit in the photoelectric conversion device according to the first embodiment of the present disclosure.
Figure 6:
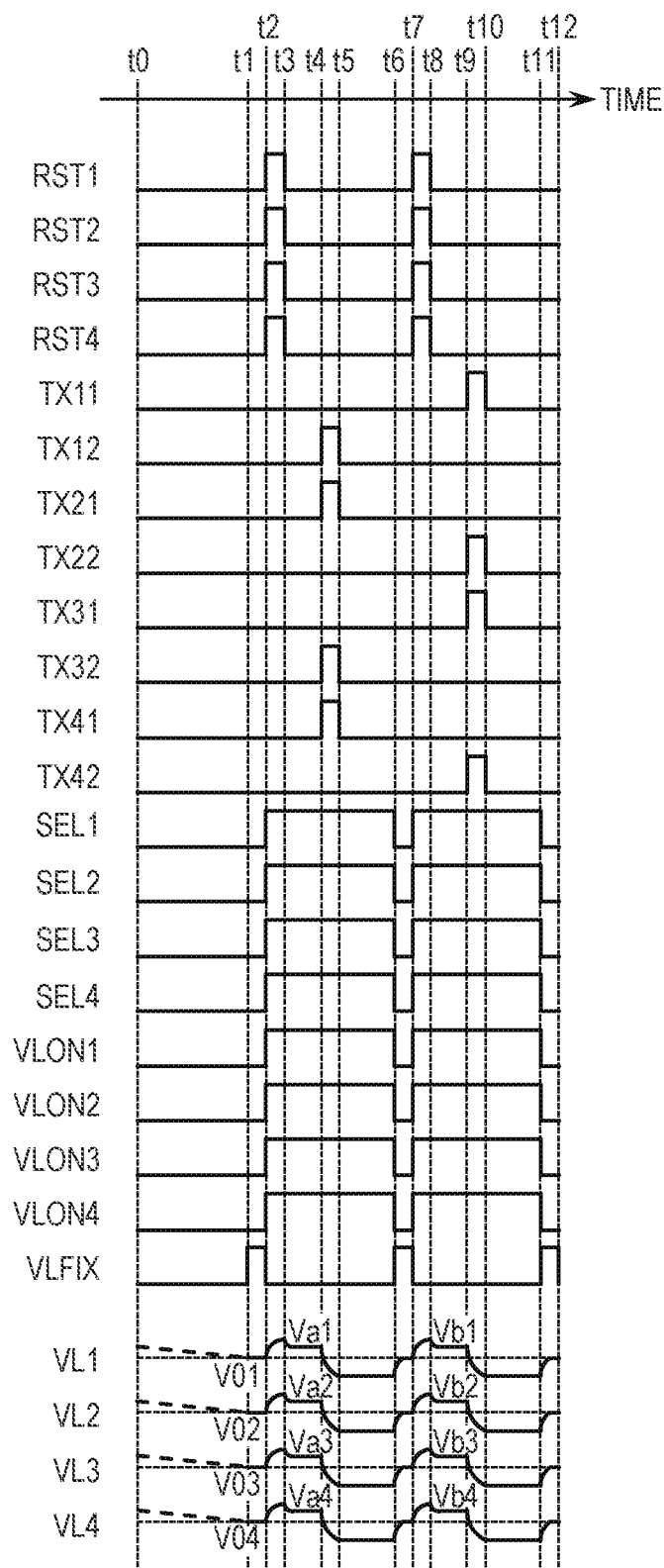
FIG. 6 and FIG. 7 are timing charts illustrating operation examples of the photoelectric conversion device according to the first embodiment of the present disclosure.
Figure 7:
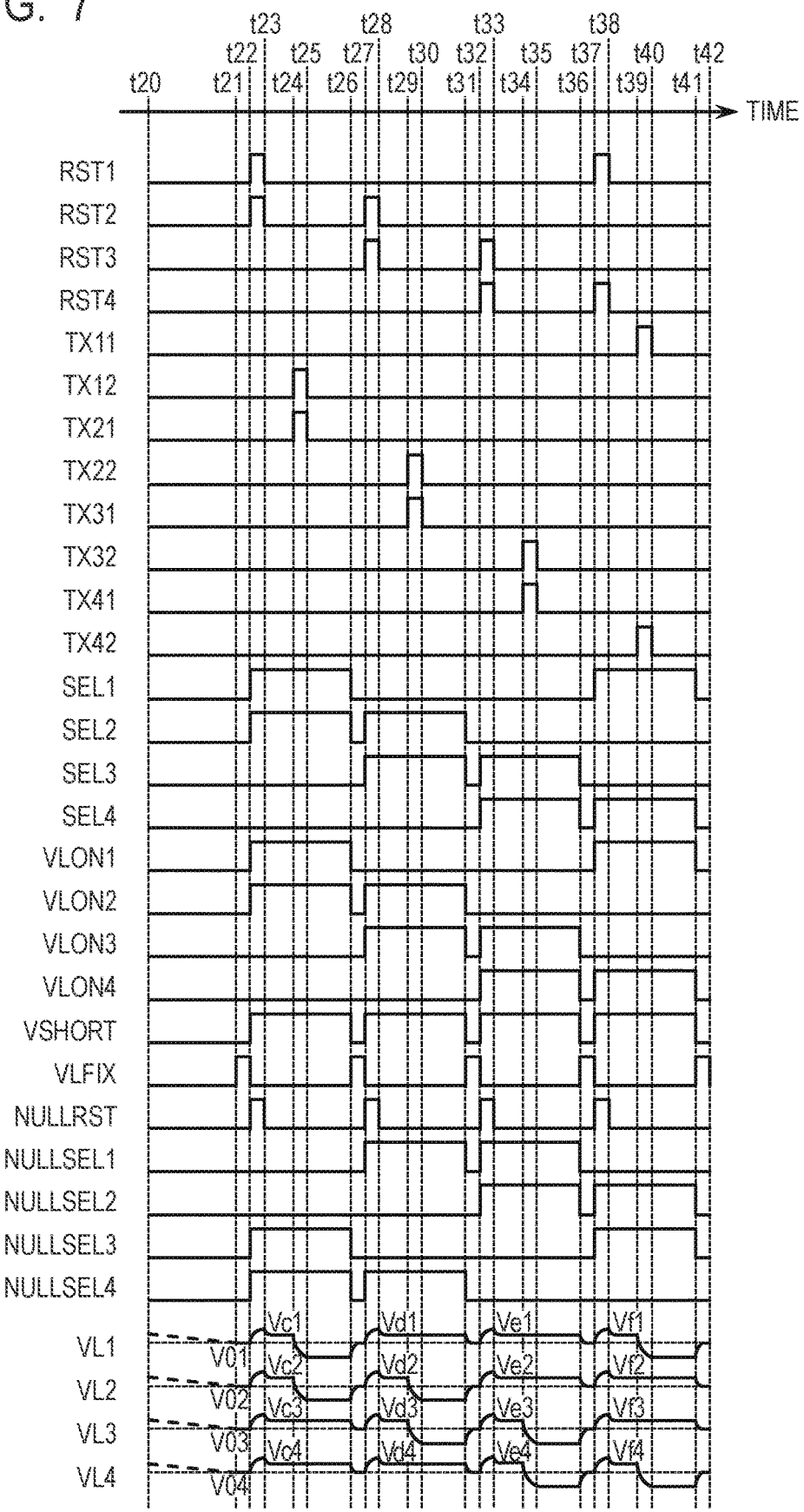

A photoelectric conversion device and a method of driving the same according to a first embodiment of the present disclosure will be described with reference to FIG. 1 to FIG. 7. FIG. 1 is a block diagram illustrating a schematic configuration of a photoelectric conversion device according to the present embodiment. FIG. 2 is a circuit diagram illustrating a configuration example of a unit pixel in the photoelectric conversion device according to the present embodiment. FIG. 3 is a circuit diagram illustrating a configuration example of a null pixel in the photoelectric conversion device according to the present embodiment. FIG. 4 is a schematic diagram illustrating a connection example of the unit pixels and the null pixels in the photoelectric conversion device according to the present embodiment. FIG. 5 is a circuit diagram illustrating a configuration example of an output line driving circuit in the photoelectric conversion device according to the present embodiment. FIG. 6 and FIG. 7 are timing charts illustrating operation examples of the photoelectric conversion device according to the present embodiment.

First, a structure of the photoelectric conversion device according to the present embodiment will be described with reference to FIG. 1 to FIG. 5.

As illustrated in FIG. 1, the photoelectric conversion device 100 according to the present embodiment includes pixel regions 10 and 20, a vertical driving circuit 30, an output line driving circuit 40, a column circuit unit 50, a horizontal driving circuit 60, a signal processing unit 70, an output circuit 80, and a system control unit 90.

In the pixel region 10, a plurality of unit pixels 12 arranged in a matrix form over a plurality of rows and a plurality of columns are provided. Each of the plurality of unit pixels 12 includes a photoelectric conversion unit including a photoelectric conversion element such as a photodiode, and outputs a pixel signal corresponding to an amount of incident light. In addition, in the pixel region 10, in addition to effective pixels which output pixel signals according to an amount of incident light, optical black pixels in which the photoelectric conversion unit is shielded from light, dummy pixels which do not output signals, and the like may be arranged.

In the pixel region 20, a plurality of null pixels 22 arranged in a matrix form over a plurality of rows and a plurality of columns are provided. Each of the plurality of null pixels 22 does not include a photoelectric conversion unit, and outputs a predetermined pixel signal corresponding to a given voltage.

The plurality of null pixels 22 constituting the pixel region 20 are arranged in different rows in the same column as the column in which the plurality of unit pixels 12 constituting the pixel region 10 are arranged. For example, a plurality of unit pixels 12 arranged in a matrix of M rows×N columns may be arranged in the pixel region 10, and a plurality of null pixels 22 arranged in a matrix of K rows×N columns may be arranged in the pixel region 20. In this case, assuming that the first row of the pixel region 10 is the first row, N-number of unit pixels 12 may be arranged in each of the first to M-th rows, and N-number of null pixels 22 may be arranged in each of the (M+1)-th to (M+K)-th rows. Further, M-number of unit pixels 12 and K-number of null pixels 22 may be arranged in each of the first to N-th columns. The number of rows and the number of columns of the pixel array arranged in the pixel regions 10 and 20 is not particularly limited.

In each row of the pixel region 10, a control line 14 is arranged so as to extend in a first direction (lateral direction in FIG. 1). Each of the control lines 14 is connected to each of the unit pixels 12 in the corresponding row arranged in the first direction, and serves as a signal line common to these unit pixels 12. In addition, in each row of the pixel region 20, a control line 24 is arranged so as to extend in the first direction. Each of the control lines 24 is connected to each of the null pixels 22 in the corresponding row arranged in the first direction, and forms a signal line common to these null pixels 22. The first direction in which the control lines 14, 24 extend may be referred to as a row direction or a horizontal direction.

Each of the control lines 14, 24 may include a plurality of signal lines. The control lines 14 and 24 are connected to the vertical driving circuit 30.

In each column of the pixel regions 10 and 20, a vertical output line 16 is arranged so as to extend in a second direction (vertical direction in FIG. 1) intersecting with the first direction. Each of the vertical output lines 16 is connected to the unit pixels 12 and the null pixels 22 in the corresponding column arranged in the second direction, and forms a signal line common to these unit pixels 12 and the null pixels 22. The second direction in which the vertical output lines 16 extend may be referred to as a column direction or a vertical direction. Each of the vertical output lines 16 includes a plurality of output lines. The vertical output lines 16 are connected to the output line driving circuit 40. A specific connection relationship between the unit pixels 12 and the null pixels 22, and the vertical output line 16 will be described later.

The vertical driving circuit 30 is a control circuit having a function of receiving a control signal supplied from the system control unit 90, generating a control signal for driving the unit pixels 12 and the null pixels 22, and supplying the generated control signal to the unit pixels 12 and the null pixels 22 via the control lines 14 and 24. A logic circuit such as a shift register or an address decoder may be used as the vertical driving circuit 30. The vertical driving circuit 30 sequentially supplies control signals to the control line 14 or 24 in each row, and sequentially drives the unit pixels 12 and the null pixels 22 in the pixel regions 10 and 20 on a row-by-row basis. The signals read out from the unit pixels 12 and the null pixels 22 on a row-by-row basis are input to the output line driving circuit 40 via the vertical output lines 16 provided in the respective columns of the pixel regions 10 and 20.

The output line driving circuit 40 is a control circuit having a function of receiving a control signal supplied from the system control unit 90, and controlling the connection between the pixel regions 10 and 20 and the column circuit unit 50 and the potential of the vertical output lines 16. Details of the output line driving circuit 40 will be described later.

The column circuit unit 50 includes a plurality of column circuits (column circuits 52 described later) which is provided corresponding to a plurality of output lines constituting the vertical output line 16 of each column of the pixel regions 10 and 20 and each includes a processing circuit and a signal holding circuit. The processing circuit has a function of performing predetermined signal processing on the pixel signal output via the corresponding output line. Examples of the signal processing performed by the processing circuit include amplification processing, correction processing by CDS (correlated double sampling), and analog-to-digital conversion (AD conversion) processing. The signal holding circuit functions as a memory for holding pixel signal processed by the processing circuit.

The horizontal driving circuit 60 is a control circuit having a function of receiving a control signal supplied from the system control unit 90, generating a control signal for reading out the pixel signal from the column circuit unit 50, and supplying the generated control signal to the column circuit unit 50. The horizontal driving circuit 60 sequentially scans the column circuits of the respective columns of the column circuit unit 50, and sequentially outputs the pixel signals held in the respective column circuits to the signal processing unit 70. A logic circuit such as a shift register or an address decoder may be used as the horizontal driving circuit 60.

The signal processing unit 70 has a function of performing predetermined signal processing on the pixel signals transferred from the column circuit unit 50. Examples of the processing executed by the signal processing unit 70 include arithmetic processing, amplification processing, and correction processing by CDS.

The output circuit 80 includes an external interface circuit, and outputs the signal processed by the signal processing unit 70 to the outside of the photoelectric conversion device 100. The external interface circuit included in the output circuit 80 is not particularly limited. For example, SerDes (SERializer/DESerializer) transmission circuits such as LVDS (Low Voltage Differential Signaling) circuit and SLVS (Scalable Low Voltage Signaling) circuit may be applied to the external interface circuit.

The system control unit 90 is a control circuit that generates control signals for controlling operations of the vertical driving circuit 30, the output line driving circuit 40, the column circuit unit 50, the horizontal driving circuit 60, and the like, and supplies the generated control signals to the respective functional blocks. Note that the control signals for controlling the operations of the vertical driving circuit 30, the output line driving circuit 40, the column circuit unit 50, the horizontal driving circuit 60, and the like are not necessarily supplied from the system control unit 90, and at least a part of them may be supplied from the outside of the photoelectric conversion device 100.

Next, a configuration example of the unit pixel 12 in the photoelectric conversion device according to the present embodiment will be described with reference to FIG. 2. FIG. 2 illustrates a unit pixel 12($m$, $n$) arranged in the m-th row and the n-th column among the plurality of unit pixels 12 constituting the pixel region 10. Here, m is an integer of 1 to M, and n is an integer of 1 to N. The circuit configuration of the other unit pixels 12 constituting the pixel region 10 may be similar to that of the unit pixel 12($m$, $n$).

As illustrated in, e.g., FIG. 2, the unit pixel 12($m$, $n$) may include photoelectric conversion elements PD1 and PD2, transfer transistors M11 and M12, a reset transistor M2, an amplifier transistor M3, and a select transistor M4. The unit pixel 12($m$, $n$) may further include a microlens and a color filter arranged on an optical path until the incident light is guided to the photoelectric conversion elements PD1 and PD2. The microlens collects incident light on the photoelectric conversion elements PD1 and PD2. The color filter selectively transmits light of a predetermined color.

The photoelectric conversion elements PD1 and PD2 are, for example, photodiodes. The photoelectric conversion element PD1 has an anode connected to a reference voltage node and a cathode connected to a source of the transfer transistor M11. The photoelectric conversion element PD2 has an anode connected to the reference voltage node and a cathode connected to a source of the transfer transistor M12. A drain of the transfer transistor M11 and a drain of the transfer transistor M12 are connected to a source of the reset transistor M2 and a gate of the amplifier transistor M3. A node FD to which the drain of the transfer transistor M11, the drain of the transfer transistor M12, the source of the reset transistor M2, and the gate of the amplifier transistor M3 are connected is a so-called floating diffusion. The floating diffusion includes a capacitance component (floating diffusion capacitance) and functions as a charge holding portion. The floating diffusion capacitance may include a p-n junction capacitance and an interconnection capacitance. A drain of the reset transistor M2 and a drain of the amplifier transistor M3 are connected to a node to which a power supply voltage (voltage VDD) is supplied. A source of the amplifier transistor M3 is connected to a drain of the select transistor M4. A source of the select transistor M4 is connected to the vertical output line 16$n$.

In the circuit configuration of FIG. 2, the control line 14 of each row includes four signal lines connected to a gate of the transfer transistor M11, a gate of the transfer transistor M12, a gate of the reset transistor M2, and a gate of the select transistor M4, respectively. A control signal TX1m is supplied from the vertical driving circuit 30 to the gates of the transfer transistors M11 of the unit pixels 12 of the m-th row. A control signal TX2m is supplied from the vertical driving circuit 30 to the gates of the transfer transistors M12 of the unit pixels 12 of the m-th row. A control signal RSTm is supplied from the vertical driving circuit 30 to the gates of the reset transistors M2 of the unit pixels 12 of the m-th row. A control signal SELm is supplied from the vertical driving circuit 30 to the gates of the select transistors M4 of the unit pixels 12 of the m-th row. When each transistor is formed of an n-channel MOS transistor, when a high-level control signal is supplied from the vertical driving circuit 30, the corresponding transistor is turned on. When a low-level control signal is supplied from the vertical driving circuit 30, the corresponding transistor is turned off.

In the present embodiment, a description will be given assuming a case where electrons among electron-hole pairs generated in the photoelectric conversion elements PD1 and PD2 by light incidence are used as signal charge. When electrons are used as the signal charge, each transistor constituting the unit pixel 12 may be formed of an n-channel MOS transistor. However, the signal charge is not limited to electrons, and holes may be used as the signal charge. When holes are used as signal charge, the conductivity type of each transistor is opposite to that described in this embodiment. Note that the term "source" or "drain" of the MOS transistor may vary depending on the conductivity type of the transistor or the target function. Some or all of names of a source and a drain used in the present embodiment are sometimes referred to as reverse names.

The photoelectric conversion elements PD1 and PD2 convert (photoelectrically convert) an incident light into charge of an amount corresponding to an amount of the incident light, and accumulate the generated charge. When the transfer transistor M11 is turned on, the charge held in the photoelectric conversion element PD1 is transferred to the node FD. When the transfer transistor M12 is turned on, the charge held in the photoelectric conversion element PD2 is transferred to the node FD. The charge transferred from the photoelectric conversion elements PD1 and PD2 are held in the capacitance component (floating diffusion capacitance) of the node FD. As a result, the node FD becomes a potential corresponding to an amount of charge transferred from the photoelectric conversion elements PD1 and PD2 by charge-voltage conversion by the floating diffusion capacitance.

The select transistor M4 connects the amplifier transistor M3 to the vertical output line 16$n$ by turning on. The amplifier transistor M3 is configured such that the voltage VDD is supplied to the drain and a bias current is supplied from a current source (a current source 18 described later) (not illustrated) via the select transistor M4 to the source, and constitutes an amplification unit (source follower circuit) having a gate as an input node. Accordingly, the amplifier transistor M3 outputs a signal based on the voltage of the node FD to the vertical output line 16$n$ via the select transistor M4. In this sense, the amplifier transistor M3 and the select transistor M4 forms an output unit that outputs a pixel signal corresponding to an amount of charge held in the node FD.

The reset transistor M2 has a function of controlling supply of a voltage (the voltage VDD) for resetting the node FD serving as a charge holding portion to the FD node. The reset transistor M2 resets the node FD to a voltage corresponding to the voltage VDD by turning on. At this time, by simultaneously turning on the transfer transistor M11, the photoelectric conversion element PD1 may be reset to a voltage corresponding to the voltage VDD. Similarly, by simultaneously turning on the transfer transistor M12, the photoelectric conversion element PD2 may be reset to a voltage corresponding to the voltage VDD.

By appropriately controlling the transfer transistors M11 and M12, the reset transistor M2, and the select transistor M4, a signal corresponding to the reset voltage of the node FD and a signal corresponding to an amount of incident light to the photoelectric conversion elements PD1 and PD2 are read out from each unit pixel 12.

Hereinafter, a signal corresponding to the reset voltage of the node FD is referred to as a noise signal (N-signal), and a signal corresponding to an amount of incident light to the photoelectric conversion elements PD1 and PD2 is referred to as a photoelectric conversion signal (S-signal).

In the unit pixel 12 of the present embodiment, two photoelectric conversion elements PD1 and PD2 share one floating diffusion (node FD). It is possible to separately read out a pixel signal based on charge generated by the photoelectric conversion element PD1 and a signal based on charge generated by the photoelectric conversion element PD2 from such a unit pixel 12. In this case, first, the N-signal and the S-signal based on the charge generated in the photoelectric conversion element PD1 may be read out, and then the N-signal and the S-signal based on charge generated in the photoelectric conversion element PD2 may be read out.

Next, a configuration example of the null pixel 22 in the photoelectric conversion device according to the present embodiment will be described with reference to FIG. 3. FIG. 3 illustrates a null pixel 22(M+k, n) arranged in the (M+k)-th row and the n-th column among the plurality of null pixels 22 constituting the pixel region 20. Here, k is an integer of 1 to K, and n is an integer of 1 to N. The circuit configuration of the other null pixels 22 constituting the pixel region 20 may be similar to that of the null pixels 22(M+k, n).

As illustrated in, e.g., FIG. 3, the null pixel 22(M+k, n) may include a reset transistor M5, an amplifier transistor M6, and a select transistor M7. That is, the null pixel 22 is different from the unit pixel 12 in that it does not include the photoelectric conversion elements PD1 and PD2 and the transfer transistors M11 and M12. The physical configurations of the reset transistor M5, the amplifier transistor M6, and the select transistor M7 may be similar to those of the reset transistor M2, the amplifier transistor M3, and the select transistor M4 of the unit pixel 12.

A source of the reset transistor M5 is connected to a gate of the amplifier transistor M6. A node FDn to which the source of the reset transistor M5 and the gate of the amplifier transistor M6 are connected is a floating diffusion similar to the node FD of the unit pixel 12. The floating diffusion includes a capacitance component (floating diffusion capacitance) and functions as a charge holding portion. The floating diffusion capacitance may include a p-n junction capacitance and an interconnection capacitance. A drain of the reset transistor M5 and a drain of the amplifier transistor M6 are connected to a node to which a power supply voltage (the voltage VDD) is supplied. A source of the amplifier transistor M6 is connected to a drain of the select transistor M7. A source of the select transistor M7 is connected to the vertical output line 16n.

In the circuit configuration of FIG. 3, the control line 24 of each row includes two signal lines connected to a gate of the reset transistor M5 and a gate of the select transistor M7. A control signal NULLRST is supplied from the vertical driving circuit 30 to the gates of the reset transistors M5 of the null pixels 22 in the (M+k)-th row. A control signal NULLSELk is supplied from the vertical driving circuit 30 to the gates of the select transistors M7 of the null pixels 22 in the (M+k)-th row. When each transistor is formed of an n-channel MOS transistor, when a high-level control signal is supplied from the vertical driving circuit 30, the corresponding transistor is turned on. When a low-level control signal is supplied from the vertical driving circuit 30, the corresponding transistor is turned off.

The select transistor M7 connects the amplifier transistor M6 to the vertical output line 16n by turning on. The amplifier transistor M6 is configured such that the voltage VDD is supplied to the drain and a bias current is supplied to the source from a current source (a current source 18 described later) (not illustrated) via the select transistor M7, and constitutes an amplification unit (source follower circuit) having a gate as an input node. Accordingly, the amplifier transistor M6 outputs a signal based on the voltage of the node FDn to the vertical output line 16n via the select transistor M7. In this sense, the amplifier transistor M6 and the select transistor M7 forms an output unit that outputs a pixel signal corresponding to an amount of charge held in the node FDn.

The reset transistor M5 has a function of controlling supply of a voltage (the voltage VDD) for resetting the node FDn serving as a charge holding portion to the FDn node. The reset transistor M5 resets the node FDn to a voltage corresponding to the voltage VDD by turning on.

By appropriately controlling the reset transistor M5 and the select transistor M7, a signal (N-signal) corresponding to the reset voltage of the node FDn is read out from each null pixel 22. In other words, the null pixel 22 is a signal generation circuit that outputs a predetermined signal (N-signal) corresponding to the reset voltage of the node FDn.

As described above, the reset transistor M5, the amplifier transistor M6, and the select transistor M7 of the null pixel 22 have the same configuration as the reset transistor M2, the amplifier transistor M3, and the select transistor M4 of the unit pixel 12. Therefore, an N-signal excluding influences of the photoelectric conversion elements PD1 and PD2 and the transfer transistors M11 and M12 from an N-signal of the unit pixel 12 is read out from the null pixel 22.

Next, an example of connection between the unit pixels 12 and the null pixels 22, and the vertical output line 16 will be described with reference to FIG. 4. In the present embodiment, as an example, a case where the vertical output line 16 of each column includes four output lines is described, but the number of output lines included in the vertical output line 16 of each column is not limited to four.

In the n-th column of the pixel regions 10 and 20, vertical output lines 16n including K output lines 16n1 to 16nK are arranged. When the vertical output line 16 of each column is formed of four output lines, the vertical output line 16n includes an output line 16n1, an output line 16n2, an output line 16n3, and an output line 16n4 as illustrated in, e.g., FIG.

4. The pixel region 20 includes at least the same number of rows as the number of output lines constituting the vertical output line 16 of each column. Here, it is assumed that the pixel region 20 includes four rows corresponding to four output lines constituting the vertical output line 16 of each column as illustrated in, e.g., FIG. 4.

Each unit pixel 12 is connected to any one of the four output lines of the vertical output line 16 arranged in the corresponding column. For example, as illustrated in FIG. 4, a unit pixel 12(1, $n$) arranged in the first row and the n-th column is connected to the output line 16$n$1 constituting the vertical output line 16$n$ of the n-th column. A unit pixel 12(2, $n$) arranged in the second row and the n-th column is connected to the output line 16$n$2 constituting the vertical output line 16$n$ of the n-th column. A unit pixel 12(3, $n$) arranged in the third row and the n-th column is connected to the output line 16$n$3 constituting the vertical output line 16$n$ of the n-th column. A unit pixel 12(4, $n$) arranged in the fourth row and the n-th column is connected to the output line 16$n$4 constituting the vertical output line 16$n$ of the n-th column. Similarly to the unit pixels 12 in the first to fourth rows, the unit pixels 12 in the fifth and subsequent rows are also connected to any one of the output lines 16$n$1 to 16$n$4 at a period of four rows.

Control signals RSTm, TX1m, TX2m, and SELm are supplied from the vertical driving circuit 30 to the unit pixels 12 arranged in the m-th row. For example, control signals RST1, TX11, TX21, and SEL1 are supplied from the vertical driving circuit 30 to the unit pixels 12 arranged in the first row. Control signals RST2, TX12, TX22 and SEL2 are supplied from the vertical driving circuit 30 to the unit pixels 12 arranged in the second row. Control signals RST3, TX13, TX23, and SEL3 are supplied from the vertical driving circuit 30 to the unit pixels 12 arranged in the third row. Control signals RST4, TX14, TX24, and SEL4 are supplied from the vertical driving circuit 30 to the unit pixels 12 arranged in the fourth row. The same applies to the unit pixels 12 in the fifth and subsequent rows.

In the unit pixel 12 of the present embodiment, it can be also considered that a pixel including the photoelectric conversion element PD1 and the transfer transistor M11 and a pixel including the photoelectric conversion element PD2 and the transfer transistor M12 share the reset transistor M2, the amplifier transistor M3, and the select transistor M4.

By configuring the unit pixel 12 in this manner, the number of transistors per pixel may be reduced as compared with a pixel configuration in which the reset transistor M2, the amplifier transistor M3, and the select transistor M4 are not shared. Therefore, for example, in the case of assuming a layout in which the photoelectric conversion elements have the same area, it is possible to reduce the size of a pixel as compared with a pixel configuration in which the reset transistor M2, the amplifier transistor M3, and the select transistor M4 are not shared.

On the other hand, when the total number of pixels to be read out increases with the miniaturization of pixels, the readout time per frame increases. However, in the photoelectric conversion device according to the present embodiment, since the vertical output line 16 including a plurality of output lines is arranged in each pixel column, it is possible to increase the number of pixel rows that may be simultaneously read out, and to shorten the readout time per frame. Therefore, according to the photoelectric conversion device of the present embodiment, it is possible to achieve both miniaturization of pixels and high-speed readout.

Each null pixel 22 is connected to any one of the four output lines of the vertical output line 16 arranged in the corresponding column. For example, as illustrated in FIG. 4, a null pixel 22(M+1, $n$) arranged in the (M+1)-th row and the n-th column is connected to the output line 16$n$1 constituting the vertical output line 16$n$ of the n-th column. A null pixel 22(M+2, $n$) arranged in the (M+2)-th row and the n-th column is connected to the output line 16$n$2 constituting the vertical output line 16$n$ of the n-th column. A null pixel 22(M+3, $n$) arranged in the (M+3)-th row and the n-th column is connected to the output line 16$n$3 constituting the vertical output line 16$n$ of the n-th column. A null pixel 22(M+4, $n$) arranged in the (M+4)-th row and the n-th column is connected to the output line 16$n$4 constituting the vertical output line 16$n$ of the n-th column.

Control signals NULLRST and NULLSELk are supplied from the vertical driving circuit 30 to the null pixels 22 arranged in the (M+k)-th row. For example, control signals NULLRST and NULLSEL1 are supplied from the vertical driving circuit 30 to the null pixels 22 arranged in the (M+1)-th row. Control signals NULLRST and NULLSEL2 are supplied from the vertical driving circuit 30 to the null pixels 22 arranged in the (M+2)-th row. Control signals NULLRST and NULLSEL3 are supplied from the vertical driving circuit 30 to the null pixels 22 arranged in the (M+3)-th row. Control signals NULLRST and NULLSEL4 are supplied from the vertical driving circuit 30 to the null pixels 22 arranged in the (M+4)-th row. The control signal NULLRST is a control signal common to the null pixels 22 of each row.

Next, a configuration example of the output line driving circuit 40 in the photoelectric conversion device according to the present embodiment will be described with reference to FIG. 5. The output line driving circuit 40 includes a plurality of circuit blocks corresponding to each of the first to N-th columns of the pixel regions 10 and 20. FIG. 5 illustrates only the circuit blocks corresponding to the vertical output line 16$n$ of the n-th column among the plurality of circuit blocks.

As illustrated in FIG. 5, the output line driving circuit 40 includes a potential fixing circuit 42, a current source circuit 44, and connection circuits 46 and 48 corresponding to each column of the pixel regions 10 and 20. The potential fixing circuit 42 includes a plurality of connection switches M81, M82, M83, and M84 corresponding to the number of output lines 16$n$1 to 16$n$K (in this case, four (K=4)) constituting the vertical output line 16$n$ of the n-th column. The current source circuit 44 includes a plurality of current sources 18 corresponding to the number of output lines 16$n$1 to 16$n$K constituting the vertical output line 16$n$ of the n-th column. The connection circuit 46 includes a plurality of connection switches M91, M92, M93, and M94 corresponding to the number of output lines 16$n$1 to 16$n$K constituting the vertical output line 16$n$ of the n-th column. The connection circuit 48 may include, for example, (K−2)-number of connection switches M101 and M102 with the number of output lines 16$n$1 to 16$n$K constituting the vertical output line 16$n$ of the n-th column as K. The column circuit unit 50 includes a plurality of column circuits 521, 522, 523 and 524 corresponding to the number of output lines 16$n$1 to 16$n$K constituting the vertical output line 16.

The connection switches M81 to M84, M91 to M94, M101, and M102 may be formed of, for example, n-channel MOS transistors. In this case, when a high-level control signal is supplied to a control node (gate), the corresponding switch is turned on (conductive state). When a low-level control signal is supplied to the control node (gate), the corresponding switch is turned off (non-conductive state).

The output line 16*nk* constituting the vertical output line 16*n* of the n-th column is connected to a node (for example, a power supply voltage node) to which a predetermined voltage is supplied via the connection switch M8k (k is an integer of 1 to K). For example, one main node (drain) of the connection switch M8k is connected to the power supply voltage node, and the other main node (source) of the connection switch M8k is connected to the output line 16*nk*. A control signal VLFIX is supplied from the system control unit 90 to the control node (gate) of the connection switch M8k. The control signal VLFIX is common to the connection switches M81 to MBK. When the connection switch M8k is turned on, the output line 16*nk* is connected to the power supply voltage node via the connection switch M8k, and becomes a predetermined potential corresponding to the power supply voltage.

The connection switch M8k may be used, for example, to increase the readout time. That is, when a high-luminance object is photographed, a potential of the vertical output line 16 at the time of reading out the S-signal is largely reduced. By turning on the connection switch M8k to set the vertical output line 16 to a potential close to the N-signal before the N-signal of the next unit pixel 12 is read out, settling of the signal when the N-signal is read out to the vertical output line 16 is advanced, and the readout time may be shortened.

The output line 16*nk* constituting the vertical output line 16*n* of the n-th column is connected to the column circuit 52*k* of the column circuit unit 50 via the connection switch M9k (k is an integer of 1 to K). That is, one main node (drain) of the connection switch M9k is connected to the output line 16*nk*, and the other main node (source) of the connection switch M9k is connected to the column circuit 52*k*. A control signal VLONk is supplied from the system control unit 90 to a control node (gate) of the connection switch M9k. The connection switches M91 to M9K are controlled by individual control signals VLON1 to VLONK. When there is an output line from which a pixel signal is not read out among the output lines 16*n*1 to 16*n*K, the output line may be disconnected from the column circuit unit 50 by controlling the connection switch M9k corresponding to the output line to be off.

A current source 18 is connected to each of the output lines 16*n*1 to 16*n*K constituting the vertical output line 16*n* of the n-th column. The current source 18 connected to the output line 16*nk* has a function of supplying a bias current to the amplifier transistor M3 via the output line 16*nk* and the select transistor M4 of the unit pixel 12 connected thereto. The current source 18 connected to the output line 16*nk* also has a function of supplying a bias current to the amplifier transistor M6 via the output line 16*nk* and the select transistor M7 of the null pixel 22 connected to the output line 16*nk*.

The connection switch M10k is connected between the output line 16*nk* on the side of the column circuit unit 50 with respect to the connection switch M9k and the output line 16*n*(k+2) on the side of the column circuit unit 50 with respect to the connection switch M9(k+2) (k is an integer from 1 to (K−2). That is, one main node (source or drain) of the connection switch M10k is connected to the output line 16*nk*, and the other main node (drain or source) of the connection switch M10k is connected to the output line 16*n*(k+2). A control signal VSHORT is supplied from the system control unit 90 to a control node (gate) of the connection switch M10k.

The arrangement of the connection switches M10k is not limited to the example illustrated in FIG. 5. For example, the connection switch M10k may be disposed between the output line 16*n*1 and the output line 16*n*2 and between the output line 16*n*3 and the output line 16*n*4, or may be disposed between the output line 16*n*1 and the output line 16*n*4 and between the output line 16*n*2 and the output line 16*n*3. The number of output lines to be connected is not necessarily two, and may be three or more. The connection switch M10k is for connecting an output line from which a pixel signal is read out and an output line from which a pixel signal is not read out, when the output line from which the pixel signal is read out and the output line from which the pixel signal is not read out exist in a certain horizontal scanning period. The arrangement of the connection switches M10k may be appropriately changed according to the number of output lines constituting the vertical output line 16 of each column, the setting of the readout mode, and the like.

According to the configuration of the output line driving circuit 40 illustrated in FIG. 5, the connection between the vertical output line 16 and the column circuit unit 50 may be appropriately changed depending on the application.

For example, an explanation will be made for a case where the connection switches M91 and M92 and the connection switches M101 and M102 are controlled to be on-state, and the connection switches M93 and M94 are controlled to be off-state. In this case, the output line 16*n*1 is connected to the column circuit 521 and the column circuit 523, and the output line 16*n*2 is connected to the column circuit 522 and the column circuit 524. That is, the pixel signal read out to the output line 16*n*1 and the pixel signal read out to the output line 16*n*2 are output to the column circuits 521 and 523, and the column circuits 522 and 524, respectively. The output lines 16*n*3 and 16*n*4 are not used for reading out pixel signals.

By controlling the output line driving circuit 40 in this manner, one pixel signal may be processed by two column circuits 52. Therefore, according to this connection, for example, multisampling driving in which pixel signals processed by the two column circuits 52 are averaged and output as one pixel signal may be performed. It is also possible to perform high dynamic range (HDR) driving in which one pixel signal is amplified by the two column circuits 52 with different gains and two amplified pixel signals are combined and output.

Therefore, according to the photoelectric conversion device according to the present embodiment, it is possible to switch the driving mode according to the application while achieving both the miniaturization of the pixel and the high-speed readout. The configuration and operation of the output line driving circuit 40 described here are merely examples, and the driving mode is not limited to the above-described example.

Next, a driving example of the photoelectric conversion device according to the present embodiment will be described with reference to FIG. 6 and FIG. 7. Here, an operation of reading out pixel signals from the unit pixels 12(1, *n*), 12(2, *n*), 12(3, *n*), and 12(4, *n*) illustrated in FIG. 4 will be described.

In the following description, among the constituent elements of the unit pixel 12, each of a portion that contributes to the readout of a signal from the photoelectric conversion element PD1 and a portion that contributes to the readout of a signal from the photoelectric conversion element PD2 may be referred to as a "pixel" for convenience. Specifically, with respect to the unit pixel 12(1, *n*), a pixel element that contributes to the readout of the signal from the photoelectric conversion element PD1 is defined as a pixel A, and a pixel element that contributes to the readout of the signal from the photoelectric conversion element PD2 is defined as a pixel B. With respect to the unit pixel 12(2, $n$), a pixel element that contributes to the readout of the signal from the photoelectric conversion element PD1 is defined as a pixel C, and a pixel element that contributes to the readout of the signal from the photoelectric conversion element PD2 is defined as a pixel D. With respect to the unit pixel 12(3, $n$), a pixel element that contributes to the readout of the signal from the photoelectric conversion element PD1 is defined as a pixel E, and a pixel element that contributes to the readout of the signal from the photoelectric conversion element PD2 is defined as a pixel F. With respect to the unit pixel 12(4, $n$), a pixel element that contributes to the readout of the signal from the photoelectric conversion element PD1 is referred to as a pixel G, and a pixel element that contributes to the readout of the signal from the photoelectric conversion element PD2 is referred to as a pixel H.

The pixel element that contributes to the readout of the signal from the photoelectric conversion element PD1 includes the photoelectric conversion element PD1, the transfer transistor M11, the reset transistor M2, the amplifier transistor M3, and the select transistor M4. The pixel element that contributes to the readout of the signal from the photoelectric conversion element PD2 includes the photoelectric conversion element PD2, the transfer transistor M12, the reset transistor M2, the amplifier transistor M3, and the select transistor M4.

FIG. 6 is a timing diagram illustrating a first driving mode in which all the output lines constituting the vertical output line 16 are used to read out pixel signals at an arbitrary time. More specifically, the first driving mode is a mode in which each of the four output lines constituting the vertical output line 16 of each column is connected to the unit pixel 12 during each horizontal scanning period, and pixel signals are read out from the four column circuits 521 to 524.

FIG. 6 illustrates control signals RST1 to RST4, TX11 to TX42, SEL1 to SEL4 supplied from the vertical driving circuit 30, and control signals VLON1 to VLON4 and VLFIX supplied from the system control unit 90. FIG. 6 also illustrates voltages VL1 to VL4 of the output lines 16$n$1 to 16$n$4. It is assumed that each control signal is in an active state when it is at a high-level, and is in an inactive state when it is at a low-level.

A period from time t0 to time t1 is a state before the start of readout. In this period, all of the control signals RST1 to RST4, TX11 to TX42, SEL1 to SEL4, VLON1 to VLON4, and VLFIX, are at low-level, i.e., inactive. The voltages VL1 to VL4 of the output lines 16$n$1 to 16$n$4 during this period are arbitrary.

The period from the time t1 to time t6 corresponds to one horizontal scanning period in which the N-signal and the S-signal are read out from each of the pixel B, the pixel C, the pixel F, and the pixel G.

At the time t1, the system control unit 90 controls the control signal VLFIX from low-level to high-level. As a result, the connection switches M81 to M84 of the potential fixing circuit 42 are turned on, and the voltages VL1, VL2, VL3, and VL4 of the output lines 16$n$1, 16$n$2, 16$n$3 and 16$n$4 change toward a predetermined voltage defined by the potential fixing circuit 42.

At subsequent time t2, the system control unit 90 controls the control signal VLFIX from high-level to low-level, and disconnects the output lines 16$n$1, 16$n$2, 16$n$3 and 16$n$4 from the potential fixing circuit 42. Thus, the voltages VL1, VL2, VL3, and VL4 of the output lines 16$n$1, 16$n$2, 16$n$3 and 16$n$4 become voltages V01, V02, V03, and V04, respectively. By setting the voltages V01, V02, V03, and V04 to voltages defined by the common potential fixing circuit 42, the voltage of the output lines 16$n$1, 16$n$2, 16$n$3 and 16$n$4 may be made uniform before the start of reading out the pixel signal.

At the time t2, the vertical driving circuit 30 controls the control signals RST1, RST2, RST3, RST4, SEL1, SEL2, SEL3 and SEL4 from low-level to high-level. The system control unit 90 controls the control signals VLON1, VLON2, VLON3, and VLON4 from low-level to high-level. As a result, the select transistors M4 of the unit pixels 12(1, $n$) to 12(4, $n$) and the connection switches M91 to M94 are turned on, and the unit pixels 12(1, $n$) to 12(4, $n$) are connected to the column circuits 521 to 524 via the output lines 16$n$1 to 16$n$4, respectively. Further, the reset transistors M2 of the unit pixels 12(1, $n$) to 12(4, $n$) are turned on, and the reset operation of the nodes FD of them is started.

At subsequent time t3, the vertical driving circuit 30 controls the control signals RST1, RST2, RST3, and RST4 from high-level to low-level. As a result, the reset transistors M2 of the unit pixels 12(1, $n$) to 12(4, $n$) are turned off, and the reset state of the nodes FD of them are released. When the reset transistor M2 is turned off, the potential of the node FD is reduced to a predetermined potential by a capacitive coupling with the gate of the reset transistor M2. The voltage of the node FD settled after the reset transistor M2 turns off is the reset voltage of the node FD.

Thereby, a signal corresponding to the reset voltage of the node FD of the unit pixel 12(1, $n$) is output to the output line 16$n$1 via the amplifier transistor M3 and the select transistor M4, and the voltage VL1 of the output line 16$n$1 becomes the voltage Va1. Similarly, a signal corresponding to the reset voltage of the node FD of the unit pixel 12(2, $n$) is output to the output line 16$n$2 via the amplifier transistor M3 and the select transistor M4, and the voltage VL2 of the output line 16$n$2 becomes the voltage Va2. A signal corresponding to the reset voltage of the node FD of the unit pixel 12(3, n) is output to the output line 16$n$3 via the amplifier transistor M3 and the select transistor M4, and the voltage VL3 of the output line 16$n$3 becomes the voltage Va3. A signal corresponding to the reset voltage of the node FD of the unit pixel 12(4, $n$) is output to the output line 16$n$4 via the amplifier transistor M3 and the select transistor M4, and the voltage VL4 of the output line 16$n$4 becomes the voltage Va4.

The signal of the voltage Va1 output from the unit pixel 12(1, $n$) to the output line 16$n$1 is processed by the column circuit 521 and read out as an N-signal of the pixel B. Similarly, the signal of the voltage Va2 output from the unit pixel 12(2, $n$) to the output line 16$n$2 is processed by the column circuit 522 and read out as an N-signal of the pixel C. The signal of the voltage Va3 output from the unit pixel 12(3, $n$) to the output line 16$n$3 is processed by the column circuit 523 and read out as an N-signal of the pixel F. The signal of the voltage Va4 output from the unit pixel 12(4, $n$) to the output line 16$n$4 is processed by the column circuit 524 and read out as an N-signal of the pixel G.

At subsequent time t4, the vertical driving circuit 30 controls the control signals TX12, TX21, TX32, and TX41 from low-level to high-level. As a result, the transfer transistor M11 of each of the unit pixels 12(2, $n$) and 12(4, $n$) is turned on, and charge accumulated during a predetermined exposure period in the photoelectric conversion element PD1 of each of the unit pixels 12(2, $n$) and 12(4, $n$) is transferred to the corresponding node FD. Further, the transfer transistor M12 of each of the unit pixels 12(1, $n$) and 12(3, $n$) is turned on, and charge accumulated during a predetermined exposure period in the photoelectric conversion element PD2 of each of the unit pixels 12(1, $n$) and 12(3, $n$) is transferred to the corresponding node FD.

Thereby, a signal corresponding to an amount of charge generated in the photoelectric conversion element PD2 of the unit pixel 12(1, $n$) is output to the output line 16$n$1 via the amplifier transistor M3 and the select transistor M4. The voltage VL1 of the output line 16$n$1 changes from the voltage Va1 toward a predetermined voltage corresponding to the amount of charge generated in the photoelectric conversion element PD2. Similarly, a signal corresponding to an amount of charge generated in the photoelectric conversion element PD1 of the unit pixel 12(2, $n$) is output to the output line 16$n$2 via the amplifier transistor M3 and the select transistor M4. The voltage VL2 of the output line 16$n$2 changes from the voltage Va2 toward a predetermined voltage corresponding to the amount of charge generated in the photoelectric conversion element PD1. A signal corresponding to an amount of charge generated in the photoelectric conversion element PD2 of the unit pixel 12(3, $n$) is output to the output line 16$n$3 via the amplifier transistor M3 and the select transistor M4. The voltage VL3 of the output line 16$n$3 changes from the voltage Va3 toward a predetermined voltage corresponding to the amount of charge generated in the photoelectric conversion element PD2. A signal corresponding to an amount of charge generated in the photoelectric conversion element PD1 of the unit pixel 12(4, $n$) is output to the output line 16$n$4 via the amplifier transistor M3 and the select transistor M4. The voltage VL4 of the output line 16$n$4 changes from the voltage Va4 toward a predetermined voltage corresponding to the amount of charge generated in the photoelectric conversion element PD1.

At subsequent time t5, the vertical driving circuit 30 controls the control signals TX12, TX21, TX32, and TX41 from high-level to low-level. Thus, the charge transfer period from the photoelectric conversion elements PD1 or PD2 to the node FD in the unit pixels 12(1, $n$) to 12(4, $n$) ends. A signal output from the unit pixel 12(1, $n$) to the output line 16$n$1 is processed by the column circuit 521 after the signal has settled, and is read out as an S-signal of the pixel B. Similarly, a signal output from the unit pixel 12(2, $n$) to the output line 16$n$2 is processed by the column circuit 522 after the signal has settled, and is read out as an S-signal of the pixel C. Further, a signal output from the unit pixel 12(3, $n$) to the output line 16$n$3 is processed by the column circuit 523 after the signal has settled, and is read out as an S-signal of the pixel F. The signal output from the unit pixel 12(4, $n$) to the output line 16$n$4 is processed by the column circuit 524 after the signal has settled, and is read out as the S-signal of the pixel G.

At the subsequent time t6, the vertical driving circuit 30 controls the control signals SEL1, SEL2, SEL3, and SEL4 from high-level to low-level. As a result, the select transistors M4 of the unit pixels 12(1, $n$) to 12(4, $n$) that have been read out are turned off, and the unit pixels 12(1, $n$) to 12(4, $n$) are isolated from the output lines 16$n$1 to 16$n$4.

The system control unit 90 controls the control signals VLON1, VLON2, VLON3, and VLON4 from high-level to low-level. Thereby, the connection switches M91 to M94 are turned off, and the output lines 16$n$1 to 16$n$4 are disconnected from the column circuits 521 to 524.

At the time t6, the system control unit 90 controls the control signal VLFIX from low-level to high-level. As a result, the connection switches M81 to M84 of the potential fixing circuit 42 are turned on, and the voltages VL1, VL2, VL3, and VL4 of the output lines 16$n$1, 16$n$2, 16$n$3 and 16$n$4 change toward a predetermined voltage defined by the potential fixing circuit 42.

A period from subsequent time t7 to time t11 corresponds to one horizontal scanning period in which the N-signal and the S-signal are read out from each of the pixel A, the pixel D, the pixel E, and the pixel H.

At the time t7, the system control unit 90 controls the control signal VLFIX from high-level to low-level, and disconnects the output lines 16$n$1, 16$n$2, 16$n$3 and 16$n$4 from the potential fixing circuit 42. Thus, the voltages VL1, VL2, VL3, and VL4 of the output lines 16$n$1, 16$n$2, 16$n$3 and 16$n$4 become voltages V01, V02, V03, and V04, respectively. By setting the voltages V01, V02, V03, and V04 to voltages defined by the common potential fixing circuit 42, the voltages of the output lines 16$n$1, 16$n$2, 16$n$3 and 16$n$4 may be made uniform before the start of reading out the pixel signal.

At the time t7, the vertical driving circuit 30 controls the control signals RST1, RST2, RST3, RST4, SEL1, SEL2, SEL3, SEL4, VLON1, VLON2, VLON3 and VLON4 from low-level to high-level. As a result, the select transistor M4 of the unit pixels 12(1, $n$) to 12(4, $n$) and the connection switches M91 to M94 are turned on, and the unit pixels 12(1, $n$) to 12(4, $n$) are connected to the column circuits 521 to 524 via the output lines 16$n$1 to 16$n$4, respectively. Further, the reset transistors M2 of the unit pixels 12(1, $n$) to 12(4, $n$) are turned on, and the reset operation of the nodes FD of them is started.

At subsequent time t8, the vertical driving circuit 30 controls the control signals RST1, RST2, RST3, and RST4 from high-level to low-level. As a result, the reset transistor M2 of each of the unit pixels 12(1, $n$) to 12(4, $n$) is turned off, and the reset state of the nodes FD of them is released. When the reset transistor M2 is turned off, the potential of the node FD is reduced to a predetermined potential by a capacitive coupling with the gate of the reset transistor M2. The voltage of the node FD settled after the reset transistor M2 turns off is the reset voltage of the node FD.

Thereby, a signal corresponding to the reset voltage of the node FD of the unit pixel 12(1, $n$) is output to the output line 16$n$1 via the amplifier transistor M3 and the select transistor M4, and the voltage VL1 of the output line 16$n$1 becomes the voltage Vb1. Similarly, a signal corresponding to the reset voltage of the node FD of the unit pixel 12(2, $n$) is output to the output line 16$n$2 via the amplifier transistor M3 and the select transistor M4, and the voltage VL2 of the output line 16$n$2 becomes the voltage Vb2. A signal corresponding to the reset voltage of the node FD of the unit pixel 12(3, $n$) is output to the output line 16$n$3 via the amplifier transistor M3 and the select transistor M4, and the voltage VL3 of the output line 16$n$3 becomes the voltage Vb3. A signal corresponding to the reset voltage of the node FD of the unit pixel 12(4, $n$) is output to the output line 16$n$4 via the amplifier transistor M3 and the select transistor M4, and the voltage VL4 of the output line 16$n$4 becomes the voltage Vb4.

The signal of the voltage Vb1 output from the unit pixel 12(1, $n$) to the output line 16$n$1 is processed by the column circuit 521 and read out as an N-signal of the pixel A. Similarly, the signal of the voltage Vb2 output from the unit pixel 12(2, $n$) to the output line 16$n$2 is processed by the column circuit 522 and read out as an N-signal of the pixel D. The signal of the voltage Vb3 output from the unit pixel 12(3, $n$) to the output line 16$n$3 is processed by the column circuit 523 and read out as an N-signal of the pixel E. The signal of the voltage Vb4 output from the unit pixel 12(4, $n$)

to the output line 16n4 is processed by the column circuit 524 and read out as an N-signal of the pixel H.

At subsequent time t9, the vertical driving circuit 30 controls the control signals TX11, TX22, TX31, and TX42 from low-level to high-level. As a result, the transfer transistor M11 of each of the unit pixels 12(1, n) and 12(3, n) is turned on, and charge accumulated during a predetermined exposure period in the photoelectric conversion element PD1 of each of the unit pixels 12(1, n) and 12(3, n) is transferred to the corresponding node FD. Further, the transfer transistor M12 of each of the unit pixels 12(2, n) and 12(4, n) is turned on, and charge accumulated during a predetermined exposure period in the photoelectric conversion element PD2 of each of the unit pixels 12(2, n) and 12(4, n) is transferred to the corresponding node FD.

Thereby, a signal corresponding to an amount of charge generated in the photoelectric conversion element PD1 of the unit pixel 12(1, n) is output to the output line 16n1 via the amplifier transistor M3 and the select transistor M4. The voltage VL1 of the output line 16n1 changes from the voltage Vb1 to a predetermined voltage corresponding to the amount of charge generated in the photoelectric conversion element PD1. Similarly, a signal corresponding to an amount of charge generated in the photoelectric conversion element PD2 of the unit pixel 12(2, n) is output to the output line 16n2 via the amplifier transistor M3 and the select transistor M4. The voltage VL2 of the output line 16n2 changes from the voltage Vb2 toward a predetermined voltage corresponding to the amount of charge generated in the photoelectric conversion element PD2. A signal corresponding to an amount of charge generated in the photoelectric conversion element PD1 of the unit pixel 12(3, n) is output to the output line 16n3 via the amplifier transistor M3 and the select transistor M4. The voltage VL3 of the output line 16n3 changes from the voltage Vb3 toward a predetermined voltage corresponding to the amount of charge generated in the photoelectric conversion element PD1. A signal corresponding to an amount of charge generated in the photoelectric conversion element PD2 of the unit pixel 12(4, n) is output to the output line 16n4 via the amplifier transistor M3 and the select transistor M4. The voltage VL4 of the output line 16n4 changes from the voltage Vb4 toward a predetermined voltage corresponding to the amount of charge generated in the photoelectric conversion element PD2.

At subsequent time t10, the vertical driving circuit 30 controls the control signals TX11, TX22, TX31, and TX42 from high-level to low-level. Thus, the charge transfer period from the photoelectric conversion elements PD1 or PD2 to the node FD in the unit pixels 12(1, n) to 12(4, n) ends. A signal output from the unit pixel 12(1, n) to the output line 16n1 is processed by the column circuit 521 after the signal has settled, and is read out as an S-signal of the pixel A. Similarly, a signal output from the unit pixel 12(2, n) to the output line 16n2 is processed by the column circuit 522 after the signal has settled, and is read out as an S-signal of the pixel D. Further, a signal output from the unit pixel 12(3, n) to the output line 16n3 is processed by the column circuit 523 after the signal has settled, and is read out as an S-signal of the pixel E. The signal output from the unit pixel 12(4, n) to the output line 16n4 is processed by the column circuit 524 after the signal has settled, and is read out as the S-signal of the pixel H.

At the subsequent time t11, the vertical driving circuit 30 controls the control signals SEL1, SEL2, SEL3, and SEL4 from high-level to low-level. As a result, the select transistors M4 of the unit pixels 12(1, n) to 12(4, n) that have been read out are turned off, and the unit pixels 12(1, n) to 12(4, n) are isolated from the output lines 16n1 to 16n4. The system control unit 90 controls the control signals VLON1, VLON2, VLON3, and VLON4 from high-level to low-level. Thereby, the connection switches M91 to M94 are turned off, and the output lines 16n1 to 16n4 are disconnected from the column circuits 521 to 524.

In this manner, pixel signals are read out from eight pixels of the pixel A, the pixel B, the pixel C, the pixel D, the pixel E, the pixel F, the pixel G, and the pixel H through the two horizontal scanning periods from the time t1 to the time t11. Thereafter, the pixel region 10 is sequentially scanned in units of four rows from the fifth row by the same procedure, and pixel signals are read out from the entire pixel region 10.

FIG. 7 is a timing chart illustrating a second driving mode in which a part of the output lines constituting the vertical output line 16 is not used for reading out pixel signals at an arbitrary time. More specifically, the second driving mode is a mode in which two of the four output lines constituting the vertical output line 16 of each column are each connected to the unit pixel 12, and a pixel signal is read out from each of the four column circuits 521 to 524.

Parasitic capacitance exists between closely adjacent output lines of a plurality of output lines forming one column of vertical output lines. In the solid-state imaging device described in PTL1, when a pixel signal is read out from a part of output lines of a plurality of output lines constituting a vertical output line of one column, the other output lines are fixed to a predetermined voltage. Therefore, the influence of parasitic capacitance between the output line from which the pixel signal is read out and the output line from which the pixel signal is not read varies depending on the potential state of the adjacent output lines. As a result, between the output lines forming one vertical output line, an amount of capacitive coupling from the vertical output line to the node FD at the time of reading out the reset signal and the settling time of the reset signal may vary. When images of the same black level are captured, amounts of signals to be read out differs between the output lines, and a step is generated as an image to deteriorate the image quality. The driving mode illustrated in FIG. 7 is effective in suppressing the influence of such potential variation between the output lines when the operation including the output line for reading out the pixel signal and the output line for not reading out the pixel signal is performed.

FIG. 7 illustrates control signals RST1 to RST4, TX11 to TX42, and SEL1 to SEL4 supplied from the vertical driving circuit 30. FIG. 7 also illustrates control signals VLON1 to VLON4, VSHORT, VLFIX, NULLRST, NULLSEL1 to NULLSEL4 supplied from the system control unit 90. FIG. 7 also illustrates voltages VL1 to VL4 of the output lines 16n1 to 16n4. It is assumed that each control signal is in an active state when it is at high-level, and is in an inactive state when it is at low-level.

A period from time t20 to time t21 is a state before the start of readout. In this period, all of the control signals RST1 to REST4, TX11 to TX42, SEL1 to SEL4, VLON1 to VLON4, VLFIX, NULLRST, and NULLSEL1 to NULLSEL4 are at low-level, i.e., inactive. The voltages VL1 to VL4 of the output lines 16n1 to 16n4 during this period are arbitrary.

A period from the time t21 to time t26 corresponds to one horizontal scanning period in which the N-signal and the S-signal are read out from each of the pixel B and the pixel C.

At the time t21, the system control unit 90 controls the control signal VLFIX from low-level to high-level. As a result, the connection switches M81 to M84 of the potential fixing circuit 42 are turned on, and the voltages VL1, VL2, VL3, and VL4 of the output lines 16n1, 16n2, 16n3 and 16n4 change toward a predetermined voltage defined by the potential fixing circuit 42.

At subsequent time t22, the system control unit 90 controls the control signal VLFIX from high-level to low-level, and disconnects the output lines 16n1, 16n2, 16n3 and 16n4 from the potential fixing circuit 42. Thus, the voltages VL1, VL2, VL3, and VL4 of the output lines 16n1, 16n2, 16n3 and 16n4 become voltages V01, V02, V03, and V04, respectively. By setting the voltages V01, V02, V03, and V04 to voltages defined by the common potential fixing circuit 42, the voltages of the output lines 16n1, 16n2, 16n3 and 16n4 may be made uniform before the start of reading out the pixel signal.

At the time t22, the vertical driving circuit 30 controls the control signals RST1, RST2, SEL1, SEL2 from low-level to high-level. As a result, the select transistors M4 of the unit pixels 12(1, n) and 12(2, n) are turned on, and the unit pixel 12(1, n) is connected to the output line 16n1, and the unit pixel 12(2, n) is connected to the output line 16n2. Further, the reset transistors M2 of the unit pixels 12(1, n) and 12(2, n) are turned on, and the reset operation of the nodes FD of them is started.

At the time t22, the vertical driving circuit 30 controls the control signals NULLRST, NULLSEL3, and NULLSEL4 from low-level to high-level. Thus, the select transistors M7 of the null pixels 22(M+3, n) and 22(M+4, n) are turned on, whereby the null pixel 22(M+3, n) is connected to the output line 16n3, and the null pixels 22(M+4, n) is connected to the output line 16n4. Further, the reset transistors M2 of the null pixels 22(M+3, n) and 22(M+4, n) are turned on, and the reset operation of the nodes FDn of them is started.

At the time t22, the system control unit 90 controls the control signals VLON1, VLON2, and VSHORT from low-level to high-level. As a result, the connection switches M91 and M92 are turned on, the output line 16n1 is connected to the column circuit 521, and the output line 16n2 is connected to the column circuit 522. Further, the connection switches M101 and M102 are turned on, the output line 16n1 is connected to the column circuit 523, and the output line 16n2 is connected to the column circuit 524. That is, two column circuits 521 and 523 are connected to the output line 16n1, and two column circuits 522 and 524 are connected to the output line 16n2.

At subsequent time t23, the vertical driving circuit 30 controls the control signals RST1, RST2, and NULLRST from high-level to low-level. As a result, the reset transistors M2 of the unit pixels 12(1, n) and 12(2, n) are turned off, and the reset state of the nodes FD of them is released. When the reset transistor M2 is turned off, the potential of the node FD is reduced to a predetermined potential by a capacitive coupling with the gate of the reset transistor M2. The voltage of the node FD settled after the reset transistor M2 turns off is the reset voltage of the node FD. Further, the reset transistors M5 of the null pixels 22(M+3, n) and 22(M+4, n) are turned off, and the reset state of the nodes FDn of them is released. When the reset transistor M5 is turned off, the potential of the node FDn is reduced to a predetermined potential by a capacitive coupling with the gate of the reset transistor M5. The voltage of the node FDn settled after the reset transistor M5 turns off is the reset voltage of the node FDn.

Thereby, a signal corresponding to the reset voltage of the node FD of the unit pixel 12(1, n) is output to the output line 16n1 via the amplifier transistor M3 and the select transistor M4, and the voltage VL1 of the output line 16n1 becomes the voltage Vc1. Similarly, a signal corresponding to the reset voltage of the node FD of the unit pixel 12(2, n) is output to the output line 16n2 via the amplifier transistor M3 and the select transistor M4, and the voltage VL2 of the output line 16n2 becomes the voltage Vc2. A signal corresponding to the reset voltage of the node FDn of the null pixel 22(M+3, n) is output to the output line 16n3 via the amplifier transistor M6 and the select transistor M7, and the voltage VL3 of the output line 16n3 becomes the voltage Vc3. Similarly, a signal corresponding to the reset voltage of the node FDn of the null pixel 22(M+4, n) is output to the output line 16n4 via the amplifier transistor M6 and the select transistor M7, and the voltage VL4 of the output line 16n4 becomes the voltage Vc4.

The signal of the voltage Vc1 output from the unit pixel 12(1, n) to the output line 16n1 is processed by the column circuits 521 and 523, and is read out as an N-signal of the pixel B. Similarly, the signal of the voltage Vc2 output from the unit pixel 12(2, n) to the output line 16n2 is processed by the column circuits 522 and 524 and read out as an N-signal of the pixel C. On the other hand, since the output lines 16n3 and 16n4 are not connected to the column circuit, the signal of the voltage Vc3 output to the output line 16n3 and the signal of the voltage Vc4 output to the output line 16n4 are not processed.

What should be noted here is that the voltages of the four output lines 16n1 to 16n4 constituting the vertical output line 16n change in the same manner at the same timing during a period from the time t22 to the time t24.

The transitional potential changes of the output lines constituting the vertical output line 16n are affected by parasitic capacitance components such as coupling with other output lines constituting the vertical output line 16n, parasitic resistance components of interconnections, and the like. For example, the output line 16n1 is coupled to the output line 16n2 adjacent thereto, and the output line 16n2 is coupled to the output lines 16n1 and 16n3 adjacent thereto.

During the period from the time t22 to the time t24, the potential of the output line 16n1 is changed by reading out the N-signal of the pixel B, and the potential of the output line 16n2 is changed by reading out the N-signal of the pixel C. At this time, the N-signals of the pixels constituting the unit pixel 12 are not read out to the output lines 16n3 and 16n4. However, the potential of the output line 16n3 is changed by reading out the N-signal of the null pixel 22(M+3, n), and the potential of the output line 16n4 is changed by reading out the N-signal of the null pixel 22(M+4, n).

In this way, by reading out the N-signal from the null pixel 22 to the output lines which do not read out the N-signal from the unit pixel 12, the potentials of the four output lines 16n1 to 16n4 constituting the vertical output line 16n change in the same manner at the same timing. Thus, the influence of parasitic capacitances between the output lines 16n1 to 16n4 may be approximately equalized.

More specifically, in the output lines 16n1 to 16n4, variation in the coupling amount from the vertical output line 16 to the node FD at the time of reading out the N-signal and variation in the settling time of the readout signal may be suppressed. That is, in each of the output lines 16n1 to 16n4, the amount of change in potential in the period from the time t22 to the time t23 becomes equal, and the voltages Vc1, Vc2, Vc3, and Vc4 become the same. Therefore, in the case where an image of the same black level is captured, a step does not occur in the amount of the readout signal from the unit pixel 12 in the period from the time t22 to the time t24.

At time t24, the vertical driving circuit 30 controls the control signals TX12 and TX21 from low-level to high-level. As a result, the transfer transistor M12 of the unit pixel 12(1, *n*) is turned on, and the charge accumulated in the photoelectric conversion element PD2 of the unit pixel 12(1, *n*) during the predetermined exposure period is transferred to the node FD. Further, the transfer transistor M11 of the unit pixel 12(2, *n*) is turned on, and the charge accumulated in the photoelectric conversion element PD1 of the unit pixel 12(2, *n*) during a predetermined exposure period is transferred to the node FD.

Thereby, a signal corresponding to an amount of charge generated in the photoelectric conversion element PD2 of the unit pixel 12(1, *n*) is output to the output line 16*n*1 via the amplifier transistor M3 and the select transistor M4. The voltage VL1 of the output line 16*n*1 changes from the voltage Vc1 to a predetermined voltage corresponding to the amount of charge generated in the photoelectric conversion element PD2. Similarly, a signal corresponding to an amount of charge generated in the photoelectric conversion element PD1 of the unit pixel 12(2, *n*) is output to the output line 16*n*2 via the amplifier transistor M3 and the select transistor M4. The voltage VL2 of the output line 16*n*2 changes from the voltage Vc2 to a predetermined voltage corresponding to the amount of charge generated in the photoelectric conversion element PD1.

At time t25, the vertical driving circuit 30 controls the control signals TX12 and TX21 from high-level to low-level. Thus, the charge transfer period from the photoelectric conversion element PD2 to the node FD in the unit pixel 12(1, *n*) and the charge transfer period from the photoelectric conversion element PD1 to the node FD in the unit pixel 12(2, *n*) are completed. A signal output from the unit pixel 12(1, *n*) to the output line 16*n*1 is processed by the column circuits 521 and 523 after settling, and is read out as an S-signal of the pixel B. Further, a signal output from the unit pixel 12(2, n) to the output line 16*n*2 is processed by the column circuits 522 and 524 after settling, and is read out as an S-signal of the pixel C.

At time t26, the vertical driving circuit 30 controls the control signals SEL1, SEL2, NULLSEL3, and NULLSEL4 from high-level to low-level. As a result, the select transistors M4 of the unit pixels 12(1, *n*) and 12(2, *n*) that have been read out the signals are turned off, and the unit pixels 12(1, *n*) and 12(2, *n*) are disconnected from the output lines 16*n*1 and 16*n*2. Further, the select transistors M7 of the null pixels 22(M+3, *n*) and 22(M+4, *n*) are turned off, and the null pixels 22(M+3, *n*) and 22(M+4, *n*) are disconnected from the output lines 16*n*3 and 16*n*4. Further, the system control unit 90 controls the control signals VLON1, VLON2, and VSHORT from high-level to low-level. As a result, the connection switches M91, M92, M101, and M102 are turned off, and the output lines 16*n*1 and 16*n*2 are disconnected from the column circuits 521 to 524.

At the time t26, the system control unit 90 controls the control signal VLFIX from low-level to high-level. As a result, the connection switches M81 to M84 of the potential fixing circuit 42 are turned on, and the voltages VL1, VL2, VL3, and VL4 of the output lines 16*n*1, 16*n*2, 16*n*3 and 16*n*4 change toward a predetermined voltage defined by the potential fixing circuit 42.

A period from subsequent time t27 to time t41 is a period in which the N-signals and the S-signals are read out from the pixels A, C, E, F, G, and H in the same manner as the readout of the N-signals and the S-signals from the pixels B and D in the period from the time t21 to the time t26.

A period from the time t27 to time t31 corresponds to one horizontal scanning period in which the N-signal and the S-signal are read out from each of the pixel D and the pixel E. In the readout of the pixel D, the control signals SEL2 and VLON2 are in the active state, and the N-signal and the S-signal are read out to the column circuits 522 and 524 via the output line 16*n*2. In the readout of the pixel E, the control signals SEL3 and VLON3 are in the active state, and the N-signal and the S-signal are read out to the column circuits 521 and 523 via the output line 16*n*3.

During the period from the time t27 to the time t31, the control signals NULLSEL1 and NULLSEL4 are in an active state. Thereby, the N-signal of the null pixel 22(M+1, *n*) is read out to the output line 16*n*1, and the N-signal of the null pixel 22(M+4, *n*) is read out to the output line 16*n*4. As described above, by reading out the N-signal from the null pixel 22 to the output line which does not read out the N-signal from the unit pixel 12, the potentials of the four output lines 16*n*1 to 16*n*4 constituting the vertical output line 16*n* change in the same manner at the same timing. Thus, the influence of parasitic capacitances between the output lines 16*n*1 to 16*n*4 may be approximately equalized.

That is, amounts of change in potential in the period from the time t27 to the time t29 become equal in the output lines 16*n*1 to 16*n*4, and the voltages Vd1, Vd2, Vd3, and Vd4 become the same. Therefore, in the case where an image of the same black level is captured, a step does not occur in the amount of the readout signal from the unit pixel 12 in the period from the time t27 to the time t29.

A period from time t32 to time t36 corresponds to one horizontal scanning period in which the N-signal and the S-signal are read out from each of the pixel F and the pixel G. In the readout of the pixel F, the control signals SEL3 and VLON3 are in an active state, and the N-signal and the S-signal are read out to the column circuits 521 and 523 via the output line 16*n*3. In the readout of the pixel G, the control signals SEL4 and VLON4 are in an active state, and the N-signal and the S-signal are read out to the column circuits 522 and 524 via the output line 16*n*4.

During the period from the time t32 to the time t36, the control signals NULLSEL1 and NULLSEL2 are in an active state. Thereby, the N-signal of the null pixel 22(M+1, *n*) is read out to the output line 16*n*1, and the N-signal of the null pixel 22(M+2, n) is read out to the output line 16*n*2. As described above, by reading out the N-signal from the null pixel 22 to the output line which does not read out the N-signal from the unit pixel 12, the potentials of the four output lines 16*n*1 to 16*n*4 constituting the vertical output line 16*n* change in the same manner at the same timing. Thus, the influence of parasitic capacitances between the output lines 16*n*1 to 16*n*4 may be approximately equalized.

That is, amounts of change in potential in the period from the time t32 to the time t34 become equal in the output lines 16*n*1 to 16*n*4, and the voltages Ve1, Ve2, Ve3, and Ve4 become the same. Therefore, in the case where an image of the same black level is captured, a step does not occur in the amount of the readout signal from the unit pixel 12 in the period from the time t32 to the time t34.

A period from time t37 to the time t41 corresponds to one horizontal scanning period in which the N-signal and the S-signal are read out from each of the pixel A and the pixel H. In the readout of the pixel A, the control signals SEL1 and VLON1 are in an active state, and the N-signal and the S-signal are read out to the column circuits 521 and 523 via the output line 16*n*1. In the readout of the pixel H, the control signals SEL4 and VLON4 are in an active state, and the N-signal and the S-signal are read out to the column circuits 522 and 524 via the output line 16n4.

During the period from the time t37 to the time t41, the control signals NULLSEL2 and NULLSEL3 are in an active state. Thereby, the N-signal of the null pixel 22(M+2, n) is read out to the output line 16n2, and the N-signal of the null pixel 22(M+3, n) is read out to the output line 16n3. As described above, by reading out the N-signal from the null pixel 22 from the output line which does not read out the N-signal from the unit pixel 12, the potentials of the four output lines 16n1 to 16n4 constituting the vertical output line 16n change in the same manner at the same timing. Thus, the influence of parasitic capacitances between the output lines 16n1 to 16n4 may be approximately equalized.

That is, amounts of change in potential in the period from the time t37 to the time t39 become equal in the output lines 16n1 to 16n4, and the voltages Vf1, Vf2, Vf3, and Vf4 become the same. Therefore, in the case where an image of the same black level is captured, a step does not occur in the amount of the readout signal from the unit pixel 12 in the period from the time t37 to the time t39.

In this manner, through the four horizontal scanning periods from the time t21 to the time t41, pixel signals are read out from eight pixels of the pixel A, the pixel B, the pixel C, the pixel D, the pixel E, the pixel F, the pixel G, and the pixel H. Thereafter, the pixel region 10 is sequentially scanned in units of four rows from the fifth row by the same procedure, and pixel signals are read out from the entire pixel region 10.

In the driving example illustrated in FIG. 7, by reading out the N-signal of the null pixel 22 from the unselected output lines, the influence of parasitic capacitances from each of the output lines to the other output lines in the plurality of output lines constituting the vertical output line 16 of the same column is made uniform. However, the gist of the present disclosure is to control the potential of the unselected output line to change in the same manner as the potential of the output line for reading out the pixel signal when a part of the plurality of output lines constituting the vertical output line 16 of each column is selected and used for reading out the pixel signal. That is, the signal to be read out to the unselected output line may be a signal having a potential equivalent to that of the output line to read out the pixel signal, and is not necessarily a signal from the null pixel 22.

In addition to the N-signal output from the null pixel 22, the N-signal output from the light-shielded pixel or the N-signal output from a thinned-out unit pixel not used for reading out the signal may be used as the N-signal to be read out to the unselected output line. Alternatively, the voltage of the unselected output line may be controlled by a voltage control circuit that controls the voltage of the output line substantially equal to the voltage change of the N-signal of the selected output line. This voltage control circuit may have a function of outputting a voltage simulating a transient voltage change of the N-signal output from the pixel to the output line at the same timing as outputting the N-signal from the pixel to the output line. As such the voltage control circuit, for example, a circuit having the same configuration as the source follower circuit included in the null pixel 22 may be used. That is, the voltage control circuit may include an amplifier transistor in which the voltage VDD is supplied to a drain and a bias current is supplied from the current source 18 through a source. A gate of the amplifier transistor is an input node, and a potential corresponding to the potential when the reset of the node FD of the null pixel 22 is released is applied to the input node. As a result, the voltage control circuit may provide a signal to the unselected output line as in the case of the null pixel 22. The voltage control circuit may operate as a limiting circuit that limits a range of a potential change of the signal line when the output line is selected. When strong light is incident on the effective pixel, charge may overflow from the photodiode to the node FD after the reset of the node FD of the effective pixel is released. As a result, the potential of the node FD decreases and the potential of the output line decreases. This decrease in potential may be suppressed by the limiting circuit. By appropriately setting the potential of the input node of the amplifier transistor included in the voltage control circuit, the voltage control circuit may be operated as the limiting circuit.

As described above, according to the present embodiment, it is possible to effectively suppress the potential variation between the output lines according to the driving mode and output a high-quality signal with reduced noise.

Second Embodiment

Figure 8:
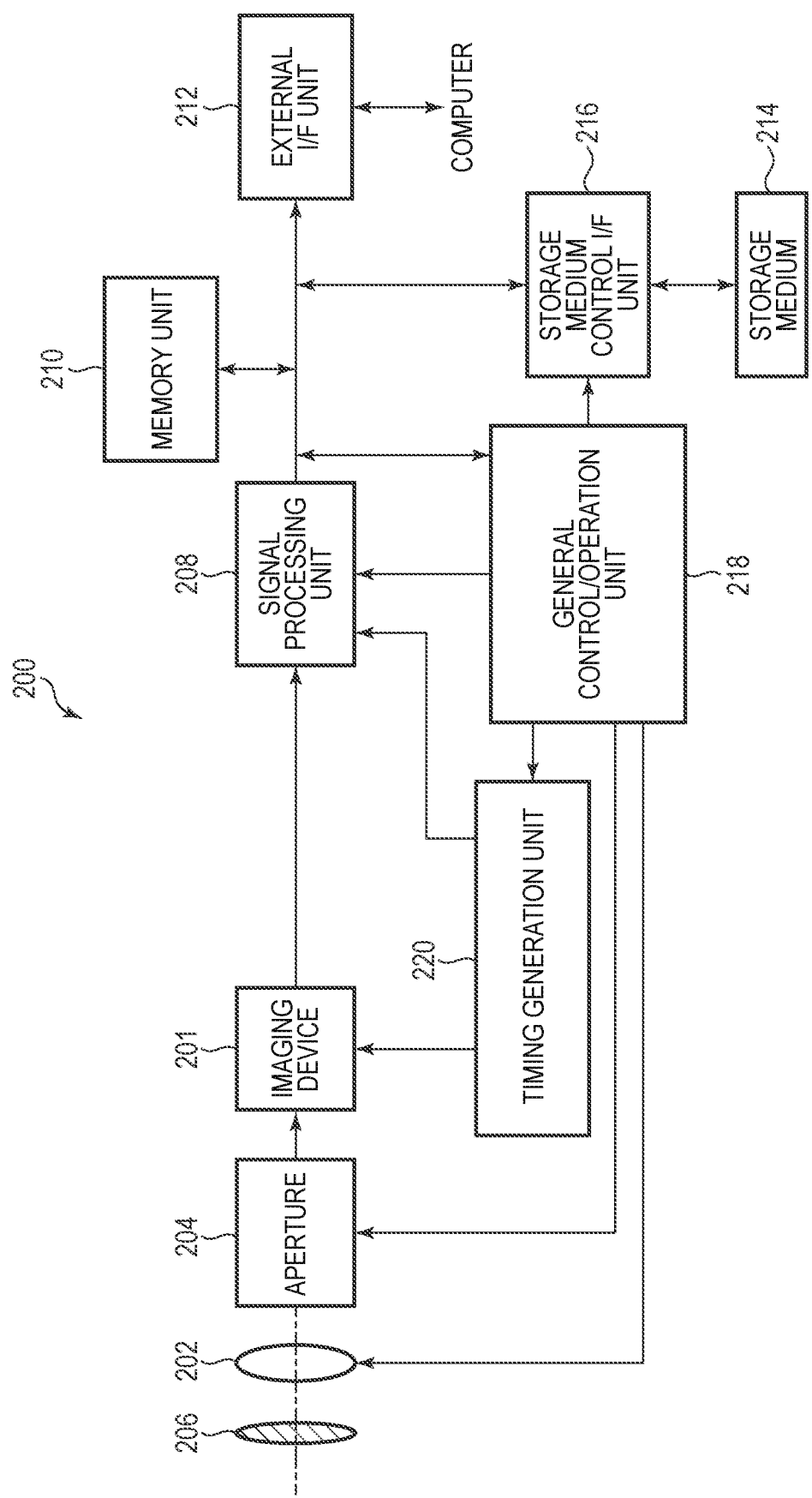
FIG. 8 is a block diagram illustrating a schematic configuration of an imaging system according to a second embodiment of the present disclosure.

An imaging system according to a second embodiment of the present disclosure will be described with reference to FIG. 8. FIG. 8 is a block diagram illustrating a schematic configuration of the imaging system according to the present embodiment.

The photoelectric conversion device 100 described in the first embodiment may be applied to various imaging systems. Examples of applicable imaging systems include digital still cameras, digital camcorders, surveillance cameras, copying machines, facsimiles, mobile phones, on-vehicle cameras, observation satellites, and the like. A camera module including an optical system such as a lens and an imaging device is also included in the imaging system. FIG. 8 is a block diagram of a digital still camera as an example of these.

The imaging system 200 illustrated in FIG. 8 includes an imaging device 201, a lens 202 for forming an optical image of an object on the imaging device 201, an aperture 204 for varying the amount of light passing through the lens 202, and a barrier 206 for protecting the lens 202. The lens 202 and the aperture 204 form an optical system that collects light on the imaging device 201. The imaging device 201 is the photoelectric conversion device 100 described in the first embodiment, and converts an optical image formed by the lens 202 into image data.

The imaging system 200 also includes a signal processing unit 208 that processes an output signal output from the imaging device 201. The signal processing unit 208 generates image data from a digital signal output from the imaging device 201. The signal processing unit 208 performs various corrections and compressions as necessary and outputs the processed image data. The imaging device 201 may include an AD conversion unit that generates a digital signal to be processed by the signal processing unit 208. The AD conversion unit may be formed on a semiconductor layer (semiconductor substrate) in which the photoelectric conversion unit of the imaging device 201 is formed, or may be formed in a semiconductor layer different from the semiconductor layer on which the photoelectric conversion unit of the imaging device 201 is formed. The signal processing unit 208 may be formed on the same semiconductor layer as the imaging device 201.

The imaging system 200 further includes a memory unit 210 for temporarily storing image data, and an external interface unit (external I/F unit) 212 for communicating with an external computer or the like. Further, the imaging system 200 includes a storage medium 214 such as a semiconductor memory for storing or reading out the imaging data, and a storage medium control interface unit (storage medium control I/F unit) 216 for storing or reading out the imaging data on or from the storage medium 214. The storage medium 214 may be built in the imaging system 200, or may be detachable.

The imaging system 200 further includes a general control/operation unit 218 that controls various calculations and operations of the entire digital still camera, and a timing generation unit 220 that outputs various timing signals to the imaging device 201 and the signal processing unit 208. Here, the timing signal or the like may be input from the outside, and the imaging system 200 may include at least the imaging device 201 and the signal processing unit 208 that processes an output signal output from the imaging device 201.

The imaging device 201 outputs the imaging signal to the signal processing unit 208. The signal processing unit 208 performs predetermined signal processing on the imaging signal output from the imaging device 201, and outputs image data. The signal processing unit 208 generates an image using the imaging signal.

As described above, according to the present embodiment, it is possible to realize an imaging system to which the photoelectric conversion device 100 according to the first embodiment is applied.

Third Embodiment

Figure 9A:
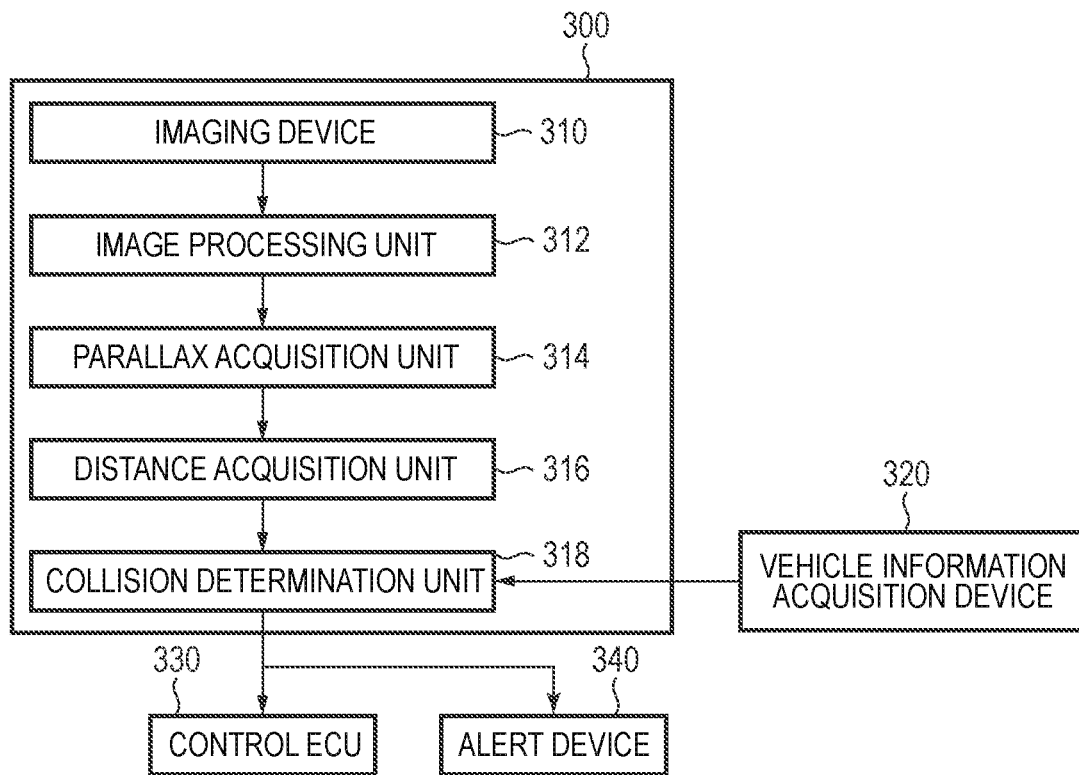
FIG. 9A is a diagram illustrating a configuration example of an imaging system according to a third embodiment of the present disclosure.
Figure 9B:
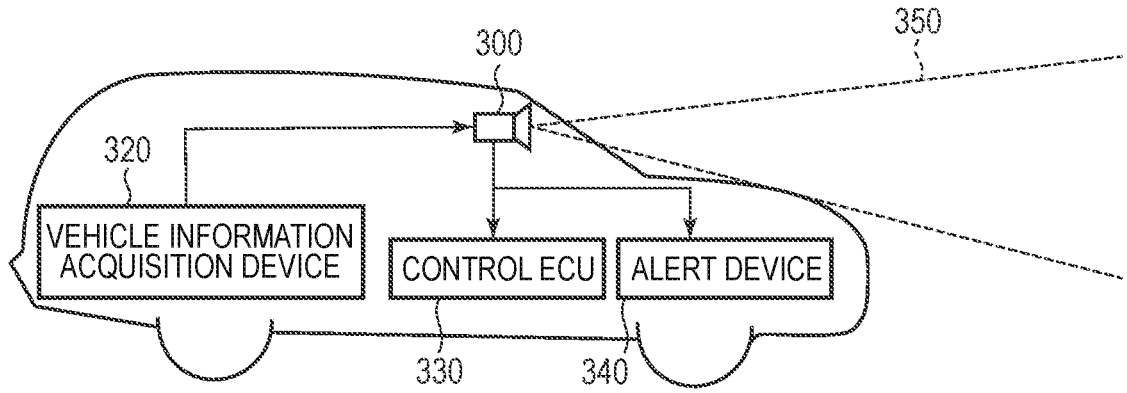
FIG. 9B is a diagram illustrating a configuration example of a movable object according to the third embodiment of the present disclosure.

An imaging system and a movable object according to a third embodiment of the present disclosure will be described with reference to FIG. 9A and FIG. 9B. FIG. 9A is a diagram illustrating a configuration of an imaging system according to the present embodiment. FIG. 9B is a diagram illustrating a configuration of a movable object according to the present embodiment.

FIG. 9A illustrates an example of an imaging system relating to an on-vehicle camera. The imaging system 300 includes an imaging device 310. The imaging device 310 is the photoelectric conversion device 100 described in the first embodiment. The imaging system 300 includes an image processing unit 312 that performs image processing on a plurality of image data acquired by the imaging device 310, and a parallax acquisition unit 314 that calculates parallax (phase difference of parallax images) from the plurality of image data acquired by the imaging system 300. The imaging system 300 includes a distance acquisition unit 316 that calculates a distance to an object based on the calculated parallax, and a collision determination unit 318 that determines whether or not there is a possibility of collision based on the calculated distance. Here, the parallax acquisition unit 314 and the distance acquisition unit 316 are examples of a distance information acquisition unit that acquires distance information to the object. That is, the distance information may be information on a parallax, a defocus amount, a distance to the object, and the like. The collision determination unit 318 may determine the collision possibility using any of these pieces of distance information. The distance information acquisition unit may be implemented by dedicated hardware or software modules. Further, it may be implemented by FPGA (Field Programmable Gate Array), ASIC (Application Specific Integrated circuit), or the like, or may be implemented by a combination of these.

The imaging system 300 is connected to a vehicle information acquisition device 320, and may acquire vehicle information such as a vehicle speed, a yaw rate, and a steering angle. Further, the imaging system 300 is connected to a control ECU 330 which is a control device that outputs a control signal for generating a braking force to the vehicle based on the determination result of the collision determination unit 318. The imaging system 300 is also connected to an alarm device 340 that issues an alert to the driver based on the determination result of the collision determination unit 318. For example, when the collision possibility is high as the determination result of the collision determination unit 318, the control ECU 330 performs vehicle control to avoid collision and reduce damage by braking, returning an accelerator, suppressing engine output, or the like. The alarm device 340 alerts a user by sounding an alarm such as a sound, displaying alert information on a screen of a car navigation system or the like, or giving vibration to a seat belt or a steering wheel.

In the present embodiment, the imaging system 300 images the periphery of the vehicle, for example, the front or the rear.

FIG. 9B illustrates an imaging system in the case of imaging an image in front of the vehicle (an imaging range 350). The vehicle information acquisition device 320 sends an instruction to the imaging system 300 or the imaging device 310. With such a configuration, the accuracy of distance measurement may be further improved.

In the above description, an example has been described in which control is performed so as not to collide with other vehicles, but the present invention is also applicable to control of automatic driving following other vehicles, control of automatic driving so as not to go out of a lane, and the like. Further, the imaging system is not limited to a vehicle such as a host vehicle, and may be applied to, for example, a movable object (moving device) such as a ship, an aircraft, or an industrial robot. In addition, the present invention may be applied not only to a movable object but also to a wide variety of equipment such as an ITS (Intelligent Transport Systems).

Fourth Embodiment

Figure 10:
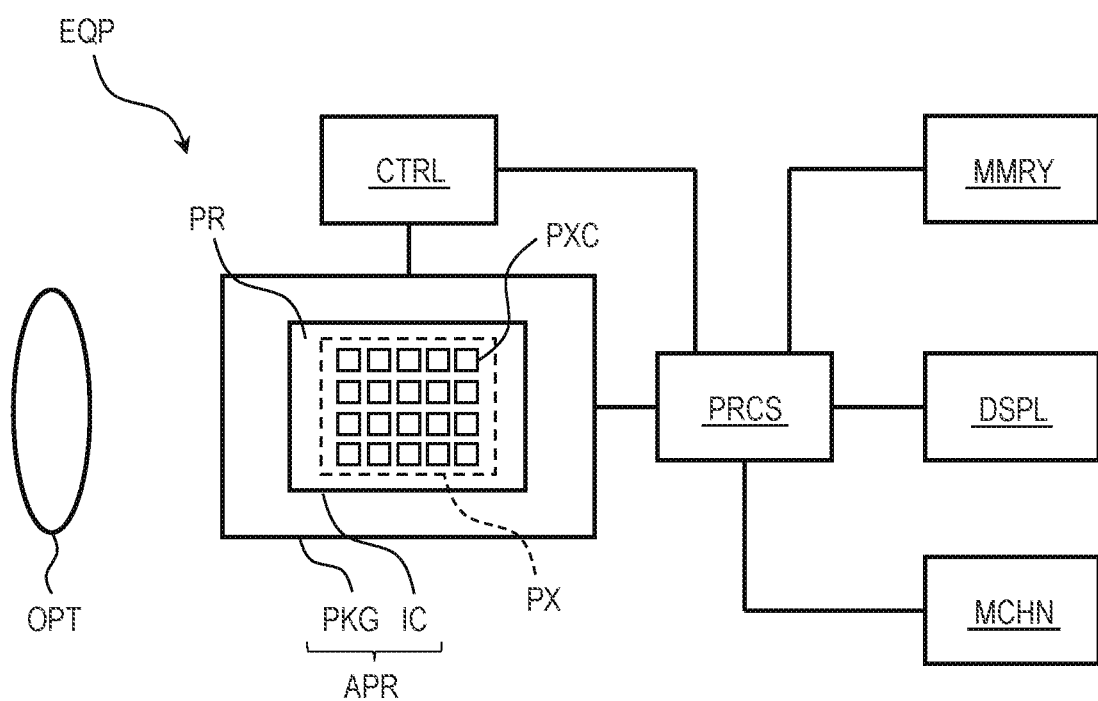
FIG. 10 is a block diagram illustrating a schematic configuration of equipment according to a fourth embodiment of the present disclosure.

Equipment according to a fourth embodiment of the present disclosure will be described with reference to FIG. 10. FIG. 10 is a block diagram illustrating a schematic configuration of equipment according to the present embodiment.

FIG. 10 is a schematic diagram illustrating equipment EQP including the photoelectric conversion device APR. The photoelectric conversion device APR has the function of the photoelectric conversion device 100 described in the first embodiment. All or a part of the photoelectric conversion device APR is a semiconductor device IC. The photoelectric conversion device APR of this example may be used, for example, as an image sensor, an AF (Auto Focus) sensor, a photometry sensor, or a distance measurement sensor. The semiconductor device IC includes a pixel area PX in which pixel circuits PXC including photoelectric conversion units are arranged in a matrix. The semiconductor device IC may include a peripheral area PR around the pixel area PX. Circuits other than the pixel circuits may be arranged in the peripheral area PR.

The photoelectric conversion device APR may have a structure (chip stacked structure) in which a first semiconductor chip provided with a plurality of photoelectric conversion units and a second semiconductor chip provided with peripheral circuits are stacked. Each peripheral circuit in the second semiconductor chip may be a column circuit corresponding to a pixel column of the first semiconductor chip. The peripheral circuits in the second semiconductor chip may be matrix circuits corresponding to the pixels or the pixel blocks of the first semiconductor chip. As a connection between the first semiconductor chip and the second semiconductor chip, a through electrode (TSV (Through Silicon Via), an inter-chip interconnection by direct bonding of a conductor such as copper, a connection by micro bumps between chips, a connection by wire bonding, or the like may be adopted.

In addition to the semiconductor device IC, the photoelectric conversion device APR may include a package PKG that accommodates the semiconductor device IC. The package PKG may include a base body to which the semiconductor device IC is fixed, a lid body made of glass or the like facing the semiconductor device IC, and a connection member such as a bonding wire or a bump that connects a terminal provided on the base body to a terminal provided on the semiconductor device IC.

The equipment EQP may further comprise at least one of an optical device OPT, a control device CTRL, a processing device PRCS, a display device DSPL, a storage device MMRY, and a mechanical device MCHN. The optical device OPT corresponds to the photoelectric conversion device APR as a photoelectric conversion device, and is, for example, a lens, a shutter, or a mirror. The control device CTRL controls the photoelectric conversion device APR, and is, for example, a semiconductor device such as an ASIC. The processing device PRCS processes a signal output from the photoelectric conversion device APR, and constitutes an AFE (analog front end) or a DFE (digital front end). The processing unit PRCS is a semiconductor device such as a CPU (central processing unit) or an ASIC. The display device DSPL may be an EL (electroluminescent) display device or a liquid crystal display device which displays information (image) obtained by the photoelectric conversion device APR. The storage device MMRY may be a magnetic device or a semiconductor device that stores information (image) obtained by the photoelectric conversion device APR. The storage device MMRY may be a volatile memory such as an SRAM or a DRAM, or a nonvolatile memory such as a flash memory or a hard disk drive. The mechanical device MCHN includes a movable portion or a propulsion portion such as a motor or an engine. In the equipment EQP, a signal output from the photoelectric conversion device APR may be displayed on the display device DSPL, and is transmitted to the outside by a communication device (not illustrated) included in the equipment EQP. Therefore, it is preferable that the equipment EQP further includes a storage device MMRY and a processing device PRCS separately from the storage circuit unit and the arithmetic circuit unit included in the photoelectric conversion device APR.

The equipment EQP illustrated in FIG. 10 may be an electronic device such as an information terminal (for example, a smartphone or a wearable terminal) having a photographing function or a camera (for example, an interchangeable lens camera, a compact camera, a video camera, and a surveillance camera). The mechanical device MCHN in the camera may drive components of the optical device OPT for zooming, focusing, and shutter operation. The equipment EQP may be a transportation device (movable object) such as a vehicle, a ship, or an airplane. The equipment EQP may be a medical device such as an endoscope or a CT scanner.

The mechanical device MCHN in the transport device may be used as a mobile device. The equipment EQP as a transport device is suitable for transporting the photoelectric conversion device APR, or for assisting and/or automating operation (manipulation) by an imaging function. The processing device PRCS for assisting and/or automating operation (manipulation) may perform processing for operating the mechanical device MCHN as a mobile device based on information obtained by the photoelectric conversion device APR.

The photoelectric conversion device APR according to the present embodiment may provide the designer, the manufacturer, the seller, the purchaser, and/or the user with high value. Therefore, when the photoelectric conversion device APR is mounted on the equipment EQP, the value of the equipment EQP may be increased. Therefore, in order to increase the value of the equipment EQP, it is advantageous to determine the mounting of the photoelectric conversion device APR of the present embodiment on the equipment EQP when the equipment EQP is manufactured and sold.

Modified Embodiments

The present disclosure is not limited to the above-described embodiments, and various modifications are possible.

For example, examples in which some of the configurations of any of the embodiments are added to other embodiments or examples in which some of the configurations of any of the embodiments are substituted with some of the configurations of the other embodiments are also an embodiment of the present disclosure.

Further, in the first embodiment, the vertical output lines 16 in each column of the pixel regions 10 and 20 are configured by four output lines, but the number of output lines constituting the vertical output lines 16 in each column is not limited to four and may be two or more.

The circuit configuration of the unit pixel 12 illustrated in FIG. 2 is an example, and may be appropriately changed. For example, the number of photoelectric conversion elements included in each unit pixel 12 may be one. The number of photoelectric conversion elements included in each unit pixel 12 may be three or more. In this case, a plurality of photoelectric conversion elements may share one FD node. Further, a plurality of photoelectric conversion elements may be pupil-division pixels sharing one microlens so that phase difference may be detected.

The unit pixel 12 does not necessarily have to include the select transistor M4. The capacitance value of the node FD may be switchable.

The imaging systems described in the second and third embodiments are examples of imaging systems to which the photoelectric conversion device of the present disclosure may be applied, and imaging systems to which the photoelectric conversion device of the present disclosure may be applied are not limited to the configurations illustrated in FIG. 8 and FIG. 9A.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to effectively suppress the potential variation between the output lines according to the driving mode and output a high-quality signal with reduced noise.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-035094, filed Mar. 8, 2022, which is hereby incorporated by reference herein in its entirety.

What is claimed is:

1. A photoelectric conversion device comprising:
a pixel region in which a plurality of unit pixels each including a photoelectric conversion unit are arranged to form a plurality of rows and a plurality of columns;
a plurality of output lines arranged at least two in each of the plurality of columns and each connected to a unit pixel of a corresponding column;
a plurality of column circuits provided corresponding to each of the plurality of output lines; and
a control circuit configured to control connections between the plurality of output lines and the plurality of column circuits,
wherein the control circuit is configured to connect a first output line out of the plurality of output lines to a corresponding first column circuit and disconnect a second output line out of the plurality of output line arranged in the same column as the first output line from a corresponding second column circuit when no pixel signal is output to the second output line at a timing when a pixel signal is output to the first output line, and
wherein the control circuit is configured to connect the first output line to further the second column circuit when no pixel signal is output to the second output line at the timing when the pixel signal is output to the first output line.

2. The photoelectric conversion device according to claim 1 further comprising a signal generation circuit configured to output a predetermined signal to at least one of the plurality of output lines,
wherein the signal generation circuit is configured to output the predetermined signal to the second output line at the timing when the pixel signal is output to the first output line.

3. The photoelectric conversion device according to claim 2, wherein the signal generation circuit is a voltage control circuit configured to control a voltage of the second output line so as to be the same as a voltage change of the first output line.

4. An imaging system comprising:
the photoelectric conversion device according to claim 1; and
a signal processing device configured to process a signal output from the photoelectric conversion device.

5. A movable object comprising:
the photoelectric conversion device according to claim 1;
a distance information acquisition unit configured to acquire distance information to an object from a parallax image based on a signal from the photoelectric conversion device; and
a control unit configured to control the movable object based on the distance information.

6. Equipment comprising:
the photoelectric conversion device according to claim 1, and
at least one of
an optical device corresponding to the photoelectric conversion device,
a control device configured to control the photoelectric conversion device,
a processing device configured to process a signal output from the photoelectric conversion device,
a mechanical device that is controlled based on information obtained by the photoelectric conversion device,
a display device configured to display information obtained by the photoelectric conversion device, and
a storage device configured to store information obtained by the photoelectric conversion device.

7. A photoelectric conversion device comprising:
a pixel region in which a plurality of unit pixels each including a photoelectric conversion unit are arranged to form a plurality of rows and a plurality of columns;
a plurality of output lines arranged at least two in each of the plurality of columns and each connected to a unit pixel of a corresponding column;
a plurality of column circuits provided corresponding to each of the plurality of output lines;
a control circuit configured to control connections between the plurality of output lines and the plurality of column circuits; and
a signal generation circuit configured to output a predetermined signal to at least one of the plurality of output lines,
wherein the control circuit is configured to connect a first output line out of the plurality of output lines to a corresponding first column circuit and disconnect a second output line out of the plurality of output line arranged in the same column as the first output line from a corresponding second column circuit when no pixel signal is output to the second output line at a timing when a pixel signal is output to the first output line,
wherein the signal generation circuit is configured to output the predetermined signal to the second output line at the timing when the pixel signal is output to the first output line, and
wherein the pixel signal output to the first output line is an N-signal output from the unit pixel connected to the first output line.

8. The photoelectric conversion device according to claim 7, wherein the signal generation circuit is other pixel provided in a column in which the first output line and the second output line are arranged, and the predetermined signal is an N-signal output from the other pixel.

9. The photoelectric conversion device according to claim 8, wherein the unit pixel outputting the pixel signal to the first output line and the other pixel are driven simultaneously.

10. The photoelectric conversion device according to claim 8, wherein the other pixel is a null pixel that does not include a photoelectric conversion unit.

11. The photoelectric conversion device according to claim 8, wherein the other pixel is a light-shielded pixel in which a photoelectric conversion unit is light-shielded.

12. The photoelectric conversion device according to claim 8, wherein the other pixel is another unit pixel provided in a column in which the first output line and the second output line are arranged.

13. The photoelectric conversion device according to claim 7, wherein the control circuit is configured to set the plurality of output lines to the same voltage before outputting the N-signal to the first output line.

14. An imaging system comprising:
the photoelectric conversion device according to claim 7; and
a signal processing device configured to process a signal output from the photoelectric conversion device.

15. A movable object comprising:
the photoelectric conversion device according to claim 7;
a distance information acquisition unit configured to acquire distance information to an object from a parallax image based on a signal from the photoelectric conversion device; and
a control unit configured to control the movable object based on the distance information.

16. Equipment comprising:
the photoelectric conversion device according to claim 7, and
at least one of
an optical device corresponding to the photoelectric conversion device,
a control device configured to control the photoelectric conversion device,
a processing device configured to process a signal output from the photoelectric conversion device,
a mechanical device that is controlled based on information obtained by the photoelectric conversion device,
a display device configured to display information obtained by the photoelectric conversion device, and
a storage device configured to store information obtained by the photoelectric conversion device.

17. A method of driving a photoelectric conversion device including a pixel region in which a plurality of unit pixels each including a photoelectric conversion unit are arranged to form a plurality of rows and a plurality of columns, a plurality of output lines arranged at least two in each of the plurality of columns and each connected to a unit pixel of a corresponding column, and a plurality of column circuits provided corresponding to each the plurality of output lines, the method comprising:
connecting a first output line out of the plurality of output lines to a corresponding first column circuit and disconnecting a second output line out of the plurality of output lines arranged in the same column as the first output line from a corresponding second column circuit, when a driving in which a pixel signal is output to the first output line and a pixel signal is not output to the second output line at a timing when the pixel signal is output to the first output line is performed,
wherein the first output line is also connected to the second column circuit when the driving is performed.

* * * * *